(12) United States Patent
Hermans

(10) Patent No.: US 11,260,340 B2
(45) Date of Patent: Mar. 1, 2022

(54) METHOD FOR REGULATING THE REGENERATION TIME OF AN ADSORPTION DRYER AND ADSORPTION DRYER IMPLEMENTING SUCH A METHOD

(71) Applicant: ATLAS COPCO AIRPOWER, NAAMLOZE VENNOOTSCHAP, Wilrijk (BE)

(72) Inventor: Hans Maria Karel Hermans, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 734 days.

(21) Appl. No.: 16/078,435

(22) PCT Filed: Feb. 13, 2017

(86) PCT No.: PCT/BE2017/000012
§ 371 (c)(1),
(2) Date: Aug. 21, 2018

(87) PCT Pub. No.: WO2017/143409
PCT Pub. Date: Aug. 31, 2017

(65) Prior Publication Data
US 2021/0170325 A1    Jun. 10, 2021

Related U.S. Application Data

(60) Provisional application No. 62/299,068, filed on Feb. 24, 2016.

(30) Foreign Application Priority Data

Apr. 29, 2016 (BE) .................. 2016/5303

(51) Int. Cl.
*B01D 53/04* (2006.01)
*B01D 53/26* (2006.01)

(52) U.S. Cl.
CPC ..... *B01D 53/0454* (2013.01); *B01D 53/0438* (2013.01); *B01D 53/261* (2013.01); (Continued)

(58) Field of Classification Search
CPC ............... B01D 53/04; B01D 53/0454; B01D 53/0438; B01D 53/261; B01D 2257/80; B01D 2259/4009; B01D 2259/402
(Continued)

(56) References Cited

U.S. PATENT DOCUMENTS 3,448,561 A   6/1969  Siebert et al.
4,023,940 A   5/1977  Shultz
(Continued)

FOREIGN PATENT DOCUMENTS

DE        1544105 A1     10/1970
DE     102013109474 A1    3/2015

OTHER PUBLICATIONS

International Search Report in related PCT Application No. PCT/BE2017/000012, dated May 3, 2017.
(Continued)

*Primary Examiner* — Frank M Lawrence, Jr.
(74) *Attorney, Agent, or Firm* — Bacon & Thomas, PLLC

(57) ABSTRACT

A method for regulating the regeneration time of an adsorption dryer, the method including the steps of: subjecting the adsorption dryer to an adsorption cycle; stopping the adsorption cycle after a preset adsorption time interval; and subsequently subjecting the adsorption dryer to a first regeneration cycle during a preset time interval. The method further includes maintaining the first regeneration cycle for an additional regeneration time interval if the measured
(Continued)

pressure dew point or relative humidity is higher than a predetermined pressure dew point or relative humidity threshold; and/or stopping the first regeneration cycle if the outlet temperature is higher than or equal to a predetermined temperature threshold, and, if the time frame in which the adsorption dryer is subjected to the first regeneration cycle is greater than a minimum heat regeneration time interval.

22 Claims, 23 Drawing Sheets

(52) U.S. Cl.
CPC .... *B01D 2257/80* (2013.01); *B01D 2259/402* (2013.01); *B01D 2259/4009* (2013.01)

(58) Field of Classification Search
USPC ....... 95/10, 11, 14, 114, 115, 117, 123, 124; 96/111, 112, 121, 125, 146; 34/80, 472, 34/473
See application file for complete search history.

(56) References Cited

U.S. PATENT DOCUMENTS

| | | | | |
|---|---|---|---|---|
| 4,127,395 | A | * | 11/1978 | McKey ................ B01D 53/261 95/10 |
| 4,197,095 | A | * | 4/1980 | White, Jr. .......... B01D 53/0454 95/15 |
| 4,718,020 | A | | 1/1988 | Duich et al. |
| 5,768,897 | A | | 6/1998 | Rainville et al. |
| 6,226,888 | B1 | * | 5/2001 | Lang .................... B01D 53/261 34/332 |
| 6,375,722 | B1 | * | 4/2002 | Henderson ......... B01D 53/0454 96/112 |
| 2012/0031273 | A1 | * | 2/2012 | Heer .................... B01D 53/261 96/116 |
| 2014/0216105 | A1 | | 8/2014 | Favero |
| 2014/0260978 | A1 | | 9/2014 | Blaszkowiak |
| 2017/0095766 | A1 | * | 4/2017 | Wright ............... B01D 53/0407 |

OTHER PUBLICATIONS

Written Opinion in related PCT Application No. PCT/BE2017/000012, dated May 3, 2017.

\* cited by examiner

METHOD FOR REGULATING THE REGENERATION TIME OF AN ADSORPTION DRYER AND ADSORPTION DRYER IMPLEMENTING SUCH A METHOD

This invention relates to a method for regulating the regeneration time of an adsorption dryer, the method comprising the steps of: subjecting the adsorption dryer to an adsorption cycle wherein a process gas is directed through a dryer inlet and moisture is adsorbed from the process gas; stopping the adsorption cycle after a preset adsorption time interval; and subsequently subjecting the dryer to a first regeneration cycle during a preset minimum heat regeneration time interval, by heating a regeneration gas prior to directing it through the dryer inlet.

BACKGROUND OF THE INVENTION

Adsorption dryers are frequently used in different applications requiring a flow of dry and cooled air.

A challenge encountered is maintaining a low energy consumption of such adsorption dryers. Typically, the adsorbent material within an adsorption dryer reaches saturation and needs to be periodically regenerated. This is typically performed by either heating a regeneration gas, prior to guiding it through the adsorbent material or just by maintaining the regeneration gas flow through the dryer for a certain time interval.

While the regeneration with the help of an external heat source is efficient in terms of regenerating the adsorbent material, it is also results in increased energy consumption.

Because of this, a balance needs to be found such that the adsorption dryer is maintained in optimum parameters with the minimum required energy consumption.

Existing dryers, like the one found in US 2014/0,216,105 A, in the name of Parker Hannifin Manufacturing S.R.L., proposes a method in which the efficiency is believed to be maintained by adopting a particular layout for the two adsorption columns. More specific, a process gas is first guided through a first column, it is then heated and further guided through said second column for regenerating it. The process is maintained for a predetermined maximum time duration and as long as the temperature at the outlet of the column does not exceed a maximum value.

A drawback of such a dryer according to the above identified patent application is the fact that by applying such a method the energy consumption is not optimized throughout the complete functioning cycle of the dryer, since the method does not consider the current state of the adsorbent column, and because of this the method is not efficient.

SUMMARY OF THE INVENTION

Taking the above mentioned drawback and concerns into account, it is an object of the present invention to provide a method capable of optimizing the energy usage based on the current state of the adsorption dryer.

Another object of the present invention is to provide a self-learning and evolving method capable of reducing the energy consumption as the adsorption dryer is functioning.

The present invention aims to provide an easy to implement and user-friendly method for regenerating an adsorption dryer.

The present invention solves at least one of the above and/or other problems by providing a method for regulating the regeneration time of an adsorption dryer, the method comprising the steps of:

subjecting the adsorption dryer to an adsorption cycle wherein a process gas is directed through a dryer inlet and moisture is adsorbed from the process gas;

stopping the adsorption cycle after a preset adsorption time interval; and subsequently subjecting the adsorption dryer to a first regeneration cycle during a preset minimum heat regeneration time interval, by heating a regeneration gas prior to directing it through the dryer inlet;

characterized in that the pressure dew point or the relative humidity within said adsorption dryer is measured after a second preset adsorption time interval, and, if said measured pressure dew point or relative humidity is higher than a predetermined pressure dew point or relative humidity threshold, maintaining the first regeneration cycle for an additional regeneration time interval; and/or the outlet temperature of the regeneration gas at a dryer outlet is measured, and, if the outlet temperature is higher than or equal to a predetermined temperature threshold, and, if the time frame in which the adsorption dryer is subjected to said first regeneration cycle is greater than a minimum heat regeneration time interval, then the method comprises the step of stopping said first regeneration cycle.

By maintaining the regeneration gas flowing through the adsorption dryer for a minimum heat regeneration time interval, $T_{Heat-min}$, an efficient regeneration of said adsorption dryer is performed, regardless of the temperature measured at the dryer outlet. Accordingly, the regeneration process can be configured through design and according to known requirements of the adsorbent material used. Because of this, influences of the environment or of a possibly higher than usual temperature of the regeneration gas are being eliminated.

Because the regeneration process is maintained until the temperature temp1 is reached, the method according to the present invention ensures that optimum parameters of the adsorption dryer are reached and the system implementing the method according to the present invention is immediately prepared for a next adsorption cycle.

Because of this, optimum results for regenerating an adsorption dryer with a low energy consumption and in a minimum amount of time can be achieved. Consequently, the energy consumption associated with the regeneration with heated regeneration gas is reduced to a minimum.

By measuring the pressure dew point or relative humidity after a first time interval, said first time interval being initiated when the adsorption cycle is started, the current capabilities of the adsorption dryer are taken into account and, based on the measured value, the time interval in which the regeneration cycle is being maintained is regulated. Accordingly, depending on the actual requirements of the network to which such adsorption dryer is connected, and on the behavior of said network, the time necessary for the regeneration is regulated, such that optimum operating conditions are reached throughout the entire functioning time.

Because of this optimization, the method according to the present invention is self-learning and adapting based on the actual state of the adsorption dryer, not based on initial or design approximations. Further, an adsorption dryer implementing a regulating method according to the present invention can perfectly function in a tropical environment or within a network with high fluctuations of humidity, since the influence of the environmental conditions upon the adsorbent material within the adsorption dryer are easily controlled and counteracted.

Tests have shown that, during the functioning of an adsorption dryer implementing a method according to the present invention, the time interval in which the heated regeneration gas is used within the regeneration process, decreases over time. Accordingly, the energy used by the adsorption dryer decreases as well.

Preferably, if said measured outlet temperature, temp1, of the regeneration gas is lower than said predetermined temperature threshold and if the time frame in which the adsorption dryer is subjected to said first regeneration cycle is larger than or equal to a maximum heat regeneration time interval, $T_{Heat\text{-}Max}$, said first regeneration cycle is stopped.

Because of this, the regeneration cycle cannot exceed a maximum set time interval.

The present invention is further directed to an adsorption dryer comprising:
- at least one adsorption vessel comprising adsorption means, an inlet and an outlet for allowing a gas to flow therethrough;
- a controller unit;
- a source of said gas, connectable to the inlet of said at least one adsorption vessel through a dryer inlet, said gas being a process and/or a regeneration gas;
- a heater positioned on said dryer inlet and configured to heat a regeneration gas flowing therethrough when the adsorption vessel is maintained in a first regeneration cycle;

characterized in that
said controller unit further comprises means to measure a pressure dew point or a relative humidity within said at least one adsorption vessel after a second preset adsorption time interval, to receive said measured data, and to maintain the flow of the regeneration gas through said inlet for an additional regeneration time interval, if said measured pressure dew point or relative humidity is higher than a first predetermined threshold; and/or said controller unit further comprises a temperature sensor positioned at the outlet of said at least one adsorption vessel and is further configured to stop the first regeneration cycle after a minimum heat regeneration time interval, if the measured outlet temperature is higher than or equal to a predetermined threshold.

By using the controller unit, an accurate measurement of the parameters of the at least one adsorption vessel can be performed and retrieved. Because of this, the regeneration cycle time is being regulated based on the latest measurements and based on the current status of the at least one adsorption vessel.

By comparing the measured dew point or determined relative humidity with a predetermined threshold and regulating the time during which the regeneration gas is flowing through the inlet, the at least one adsorption vessel is maintained at required standards throughout the entire functioning and the adsorption dryer is capable of providing at the dryer outlet a gas with at least the required level of humidity.

Because of its capabilities, the controller unit will help in reducing the energy consumption of the adsorption dryer during functioning, irrespective of the process gas parameters.

Because the controller unit uses the temperature measurement at the outlet of the at least one adsorption vessel, said adsorption vessel is not allowed to reach very high temperatures that would possibly cause damages to the adsorbent material comprised therein. On the other hand, by maintaining the first regeneration cycle for a minimum set time interval, a full regeneration of the adsorbent material is assured and accordingly optimum functioning parameters of the adsorption dryer.

The present invention is also directed to a controller unit regulating the time in which an adsorption dryer is maintained in a regeneration cycle, said controller unit comprising:
- a timer, for determining the time interval in which an adsorption vessel of said adsorption dryer is maintained in a regeneration cycle, said adsorption vessel comprising an inlet and an outlet for allowing a flow of gas therethrough;

characterized in that said controller unit:
- further comprises: a user interface for receiving a requested pressure dew point or relative humidity, a dew point pressure sensor or a relative humidity determinant positioned within the adsorption vessel of said adsorption dryer,
  being further configured to maintain the adsorption dryer in a first regeneration cycle for an additional regeneration time interval, if the measured pressure dew point or the relative humidity is higher than said requested pressure dew point or relative humidity; and/or
- further comprises a temperature sensor positioned at the outlet of said adsorption vessel and is further configured to stop the first regeneration cycle if the measured outlet temperature is greater than or equal to a predetermined temperature threshold, and, if said time interval in which the adsorption dryer is maintained in said regeneration cycle is greater than a minimum heat regeneration time interval.

The present invention is also directed to a use of a controller unit according to the present invention in an adsorption dryer for compressed gas.

BRIEF DESCRIPTION OF THE DRAWINGS

With the intention of better showing the characteristics of the present invention, some preferred configurations according to the present invention are described hereinafter by way of an example, without any limiting nature, with reference to the accompanying drawings, wherein.

DETAILED DESCRIPTION OF THE INVENTION

Figure 1:
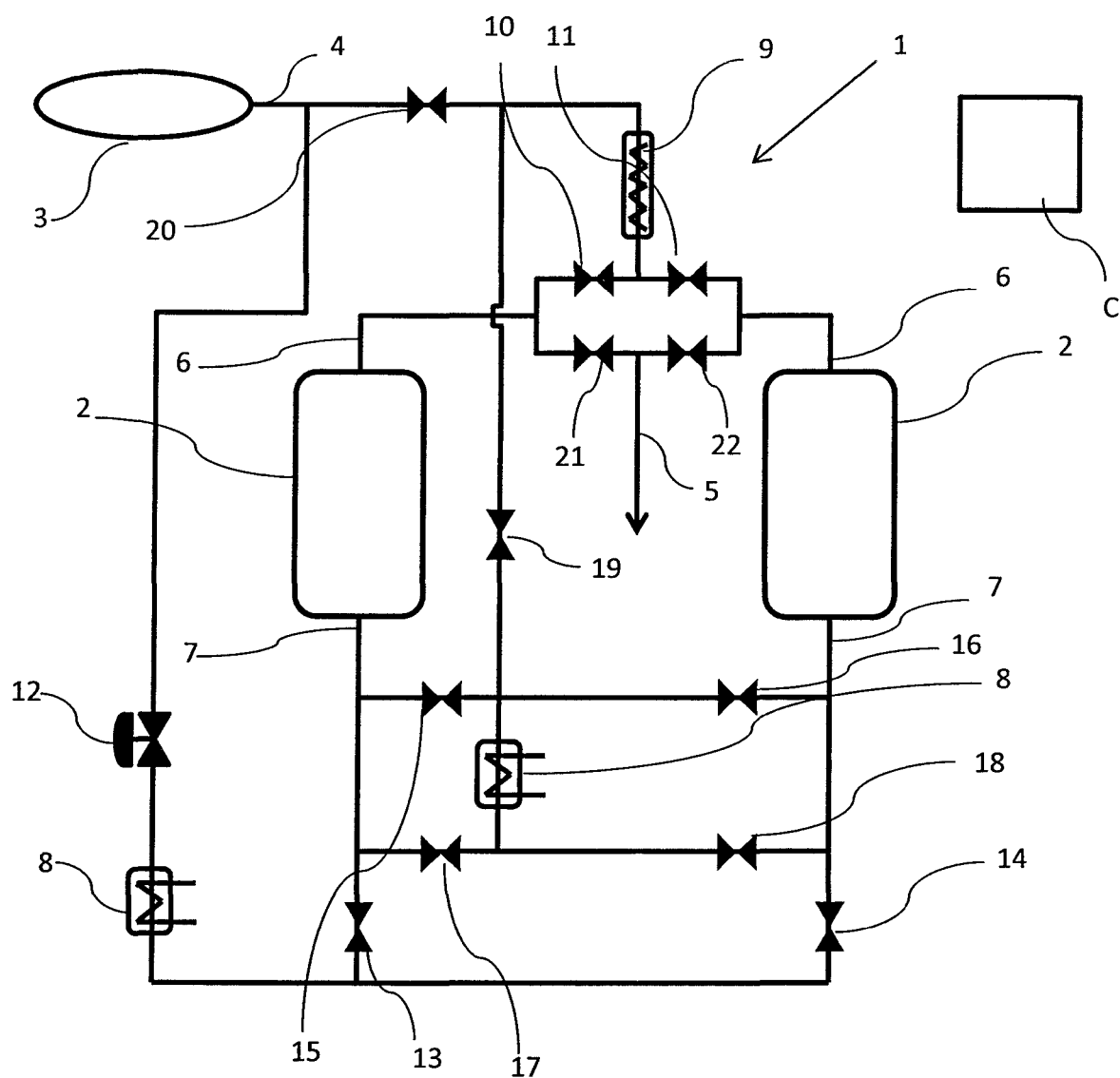
FIG. 1 schematically represents an adsorption dryer according to an embodiment of the present invention.

FIG. 1 shows an adsorption dryer 1 comprising, in this case, two adsorption vessels 2 connected to a source of gas 3 through a dryer inlet 4. Said adsorption dryer 1 being capable of removing moisture from a gas flowing through said dryer inlet 4 and provide, through a dryer outlet 5, dry and possibly cold gas to an external network (not shown).

In the context of the present invention it should be understood that the adsorption dryer 1 can also comprise more than two adsorption vessels 2 or even only one adsorption vessel 2.

Preferably said adsorption vessels 2 comprise an adsorbent material (not shown) capable of capturing the moisture from the gas flowing therethrough.

In the context of the present invention it should be understood that adsorption could also include absorption.

Each of the two adsorption vessels 2 comprises an inlet 6 and an outlet 7 for allowing a gas to flow therethrough. The adsorption dryer 1 further comprises a controller unit C and a source of a gas 3, connectable to the dryer inlet 4, said gas being a process and/or a regeneration gas.

A heater 9 is preferably positioned on said dryer inlet 4 and configured to heat a regeneration gas flowing therethrough when the at least one adsorption vessel 2 is maintained in a first regeneration cycle.

Preferably, said controller unit C further comprises means to measure a pressure dew point or a relative humidity within said at least one adsorption vessel 2. Said means can be in the shape of a sensor such as for example a temperature sensor and/or a pressure sensor positioned within said at least one adsorption vessel 2, or at the inlet 6 of said adsorption vessel 2, or on the dryer outlet 5.

Preferably, the pressure dew point or relative humidity is measured after a second preset adsorption time interval, T2.

When measuring the relative humidity, the pressure and/or temperature within the respective adsorption vessel 2 is/are preferably also measured by using for example a pressure and/or a temperature sensor (not shown) and based on these measurements, the pressure dew point can be calculated with known formulas or deduced from existing tables. For such determination, the measurements of the temperature sensor positioned at the outlet 7 of the adsorption vessel 2 can be used or another temperature sensor.

The controller unit C receives said measured data through a communication channel such as a wired or a wireless communication channel and maintains the flow of the regeneration gas through said inlet 6 for an additional regeneration time interval, $T_{E1}$, if said measured pressure dew point or determined relative humidity is higher than a first predetermined threshold.

The controller unit C further makes use of a temperature sensor (not shown) positioned at the outlet 7 of said at least one adsorption vessel 2 and is further configured to stop the first regeneration cycle after a minimum heat regeneration time interval, $T_{Heat-min}$, if the measured outlet temperature, temp1, at the outlet 7 of said adsorption vessel 2 is higher than or equal to a predetermined threshold.

Preferably, when stopping the first regeneration cycle, the controller unit C actuates an inlet valve 10 and/or 11 and stops the flow of regeneration gas at the inlet 6 of the adsorption vessel 2.

In another embodiment according to the present invention, when stopping the first regeneration cycle, the controller unit C stops the heater 9.

In a preferred embodiment according to the present invention, but not limiting to, said source of a gas 3 comprises a compressor unit.

When said source of gas 3 is a compressor unit, it should be understood that the regeneration gas coming from said compressor unit and flowing through the dryer inlet 4 is a regeneration gas that has been subjected to a compression process and is therefore heated regeneration gas, reaching a relatively high temperature.

For a more efficient design, the adsorption dryer 1 comprises at least two adsorption vessels 2, each having an inlet 6 and an outlet 7. Preferably, the outlet of the compressor unit is connected through a dryer inlet 4 to the inlet 6 of the at least two adsorption vessels 2.

In another preferred embodiment, when the adsorption dryer 1 comprises at least two adsorption vessels 2 and one of these adsorption vessels 2 is subjected to a regeneration cycle and the other adsorption vessel 2 is subjected to an adsorption cycle, the flow of gas from the outlet 7 of one of the at least two adsorption vessels 2 can be guided through the inlet 6 of the other adsorption vessel 2.

Preferably, the flow of gas from the outlet 7 of the adsorption vessel 2 being subjected to a regeneration cycle is being guided through the inlet 6 of the adsorption vessel 2 being subjected to an adsorption cycle.

Even though other configurations are possible, in the context of the present invention it is preferred that during the adsorption cycle, process gas is directed through the outlet 7 of the adsorption vessel 2, and dried process gas is flowing through the inlet 6.

If is further preferred that during the regeneration cycle, regeneration gas is preferably being directed through the inlet 6 of the adsorption vessel 2, and relatively wet regeneration gas is flowing through the outlet 7.

In the context of the present invention the inlet 6 is positioned at the bottom of the adsorption vessel 2 and the outlet 7 is positioned at the top of the adsorption vessel 2. It should not be excluded that the adsorption vessels 2 can be also rotated such that the outlet 7 is connected to the dryer inlet 4 and the inlet 6 is connected to the dryer outlet 5, such that the above referenced flow and benefit can still be achieved.

In another embodiment according to the present invention, each of the at least two adsorption vessels 2 comprises a temperature sensor positioned at the outlet 7.

In another embodiment according to the present invention, said temperature sensor can also be mounted within said at least one adsorption vessel 2, in the vicinity of the outlet 7.

Preferably, the adsorption dryer 1 further comprises a cooler 8 positioned at the outlet 7 of the at least one adsorption vessel 2 and being configured to cool the gas flowing through said outlet 7.

The adsorption dryer 1 can comprise one cooler 8 positioned on a common outlet 7 of the at least two adsorption vessels 2, or each of said at least two adsorption vessels 2 can comprise a cooler 8 positioned at the outlet 7 of each adsorption vessel 2.

Preferably, the controller unit C further comprises means to alternatively maintain each of the at least two adsorption vessels 2 in a second regeneration cycle wherein said heater 9 is switched off; subsequently in a first regeneration cycle wherein said heater 9 is switched on; subsequently in a cooling cycle wherein the gas is cooled by means of a cooler 8; and subsequently in a standby cycle wherein the flow of gas through said adsorption vessel 2 is stopped.

Preferably, the controller unit C is further configured to regulate the time interval in which each of the adsorption vessels 2 is maintained in said first regeneration cycle, second regeneration cycle, cooling cycle and standby cycle based on the measured temperature and measured pressure dew point or relative humidity.

Preferably, the controller unit C is configured to maintain the adsorption vessel 2 in a standby cycle until the measured pressure dew point or relative humidity is higher than the predetermined pressure dew point or relative humidity threshold.

In this way, the controller is able to regulate the time intervals for each of said adsorption vessels 2 individually, according to the need and current state.

The adsorption dryer 1 can further comprise a regulating valve 12 for controlling the volume of gas flowing through the inlet 6. Preferably the regulating valve 12 is provided on a different conduit than where the heater is provided.

When the heater 9 is switched on by said controller unit C, the volume of gas allowed to flow through said heater 9 will have an influence on the temperature of the gas reaching the adsorption vessel 2. Accordingly, by opening the regulating valve 12 and allowing only a certain percentage of the volume of gas to flow through the inlet 6, the temperature of said gas will be higher than when the entire volume of gas is allowed to reach the inlet 6 of the adsorption vessel 2.

Because of this, the comparison of the temperature at the outlet 7 of the adsorption vessel 2 with a temperature threshold becomes very important for maintaining the properties of the adsorbent material.

Preferably, when said at least one adsorption vessel 2 is maintained in a cooling cycle, the controller unit C is configured to actuate a two way valve 13 and/or 14 for allowing the flow of gas coming from said source of gas 3 to be cooled by the cooler 8 and flow through the adsorption vessel 2.

When said cooler 8 is used for cooling the gas flowing through the dryer outlet 5, the adsorption dryer 1 further uses control valves 15, 16, 17, 18 and 19 for controlling the path of the gas within the adsorption dryer 1.

Preferably, the adsorption dryer 1 further comprises a cut-off valve 20, configured to stop the flow of gas from the source of gas 3 towards the inlet 6 of the adsorption vessels 2.

The adsorption dryer 1 further comprises an outlet valve 21 or 22 for allowing the gas from the dryer outlet 5 to reach an external network (not shown). It goes without saying that, if the adsorption dryer 1 comprises two or more adsorption vessels 2, each of said adsorption vessels 2 can comprise one outlet valve 21 or 22.

The present invention is further directed to a controller unit C regulating the time in which the adsorption dryer 1 is maintained in a regeneration cycle, said controller unit C comprising: a timer, for determining the time interval in which an adsorption vessel 2 of said adsorption dryer 1 is maintained in a regeneration cycle, said adsorption vessel 2 comprising an inlet 6 and an outlet 7 for allowing a flow of gas therethrough.

The controller unit C preferably further comprises a user interface (not shown) for receiving a requested pressure dew point or relative humidity, a dew point pressure sensor or a relative humidity determinant positioned within the adsorption vessel 2 of said adsorption dryer 1.

In the context of the present invention a relative humidity determinant should be understood as module adapted to measure parameters such as pressure and temperature and determine the relative humidity by calculating it with known formulas or deduce it from existing tables. Such module being a separate module, part of the adsorption dryer 1 or being incorporated in the controller unit C.

The user interface can be part of the adsorption dryer 1 or can be an external module such as an external computer or electronic platform communicating through a wired or wireless connection with the adsorption dryer 1.

Preferably, a user of the adsorption dryer 1 can select the value of the pressure dew point or relative humidity through said user interface, or the value of said pressure dew point or relative humidity can be selected through design.

The electronic platform can be the external network using the dried gas provided by said adsorption dryer 1.

The controller unit C is preferably further configured to maintain the adsorption dryer 1 in a first regeneration cycle for an additional regeneration time interval, $T_{E1}$, if the measured pressure dew point or the relative humidity is higher than said requested pressure dew point or relative humidity; and/or further comprises a temperature sensor positioned at the outlet 7 of said adsorption dryer 1 and is further configured to stop the first regeneration cycle if the measured outlet temperature, temp 1, at the outlet 7 of the adsorption dryer is greater than or equal to a predetermined temperature threshold, and, if said time interval in which the adsorption dryer 1 is maintained in said regeneration cycle is greater than a minimum heat regeneration time interval, $T_{Heat-min}$.

In a preferred embodiment according to the present invention, the controller unit C further comprises a processing unit configured to recalculate said additional regeneration time interval, $T_{E1}$ by adding a first predetermined time interval, t0, to a previously set additional regeneration time interval $T_{E1,0}$.

In another preferred embodiment, the controller unit C further comprises storing means configured to store said recalculated additional regeneration time interval, $T_{E1}$, said controller unit C applying said recalculated additional time interval in a subsequent regeneration cycle.

Said storing means can be in the shape of a local hard drive or an external hard drive with which the controller unit C can communicate through a wired or wireless connection.

Preferably, but not limiting to, the controller unit C further comprises means for maintaining the regeneration cycle for a second additional regeneration time interval, $T_{E2}$, if the measured pressure dew point or relative humidity is lower than the requested pressure dew point or relative humidity.

In a further preferred embodiment according to the present invention, the controller unit C further comprises calculating means configured to calculate said second additional regeneration time interval, $T_{E2}$, by adding a second predetermined time interval, t1, to a previously set time interval, $T_{E2,0}$.

Preferably, said calculating means are in the shape of a processor having computing capabilities. Said processor can be positioned at the level of the adsorption dryer 1 or can be at the level of the external computer or electronic platform with which the controller is preferably communicating.

If said calculating means are positioned at the level of the external computer or electronic platform, the adsorption dryer 1 is preferably sending through a wired or wireless connection measured data and is able to receive calculated data.

Preferably, the controller unit C further comprises storing means configured to store said recalculated second additional regeneration time interval, $T_{E2}$, and apply it in a subsequent regeneration cycle.

As mentioned above, said storing means can be in the shape of a local hard drive or an external hard drive with which the controller unit C can communicate through a wired or wireless connection.

In another embodiment according to the present invention, said calculating means are configured to further calculate:
- a minimum heat regeneration time interval, $T_{Heat-min}$, by adding said additional regeneration time interval, $T_{E1}$, to a preset minimum heat regeneration time interval, Time3; or by adding said second additional regeneration time interval, $T_{E2}$, to said preset minimum heat regeneration time interval Time 3; and/or
- a maximum heat regeneration time interval in which the first regeneration cycle can be maintained, $T_{Heat-Max}$, by adding said additional regeneration time interval, $T_n$, to a preset maximum heat regeneration time interval, Time4; or by adding said second additional regeneration time interval, $T_{E2}$, to said preset maximum heat regeneration time interval, Time4; and/or minimum regeneration time interval, $T_{min}$, in which the flow of gas from the outlet of the compressor unit is maintained at the dryer inlet 4 by: subtracting said additional regeneration time interval, $T_{E1}$, from said preset minimum regeneration time interval, Time1, or by subtracting said second additional regeneration time interval, $T_{E2}$, from said preset minimum regeneration time interval, Time1; and/or a maximum regeneration time interval, $T_{Max}$, in which the flow of gas from the outlet of a compressor unit is maintained at the dryer inlet 4 by subtracting said additional regeneration time interval, $T_{E1}$, from a preset maximum regeneration time interval, Time2, or by subtracting said second additional regeneration time interval, $T_{E2}$, from said preset maximum regeneration time interval, Time2.

In yet another embodiment the controller unit C further comprises means to store one or more of said time intervals: $T_{Heat-min}$ and/or $T_{Heat-Max}$ and/or $T_{min}$ and/or $T_{Max}$, and apply it in a subsequent regeneration cycle.

In the context of the present invention is should be understood that said means to store said recalculated time intervals can be the same as said storing means configured to store said recalculated second additional regeneration time interval, $T_{E2}$, or can be a different one positioned at the level of the adsorption dryer 1 or externally.

Further, the controller unit C can comprises means for maintaining said adsorption vessel 2 in a first regeneration cycle for the calculated additional regeneration time interval, $T_{E1}$, if said calculated additional regeneration time interval, $T_{E1}$, or second additional regeneration time interval, $T_{E2}$, is comprised within the interval delimited by the minimum heat regeneration time interval, $T_{Heat-min}$, and the maximum heat regeneration time interval, $T_{Heat-Max}$, and/or stopping said first regenerating cycle after said maximum heat regeneration time interval, $T_{Heat-Max}$, when said calculated additional regeneration time interval, $T_{E1}$ or second additional regeneration time interval, $T_{E2}$, is higher than said maximum heat regeneration time interval, $T_{Heat-Max}$.

Preferably, but not limiting to, the controller unit C comprises means for maintaining said adsorption vessel 2 in a second regeneration cycle if said calculated additional regeneration time interval, $T_{E1}$, or second additional regeneration time interval, $T_{E2}$, is comprised within the interval delimited by the minimum regeneration time interval, $T_{min}$, and the maximum regeneration time interval, $T_{Max}$, and/or stopping said first regenerating cycle after the maximum regeneration time interval, $T_{Max}$, when said calculated additional regeneration time interval, $T_{E1}$, or second additional regeneration time interval, $T_{E2}$, is higher than the maximum regeneration time interval, $T_{Max}$.

The present invention is further directed to the use of a controller unit C according to the present invention in an adsorption dryer 1 for compressed gas.

The present invention is further directed to a method for efficiently performing a regeneration cycle, such that the adsorption dryer 1 is prepared for a subsequent adsorption cycle.

Typically, an adsorption dryer 1 is subjected to an adsorption cycle whereby a process gas is directed through an inlet 6 of the at least one adsorption vessel 2 and moisture is adsorbed from the process gas.

In the context of the present invention it should be understood that the inlet 6 and the outlet 7 can also be switched between each other, such that said process gas can also be directed through the outlet 7 of the at least one adsorption vessel 2 and relatively dry gas can be retrieved at the inlet 6 of said at least one adsorption vessel 2.

After a certain functioning time, the adsorbent material becomes saturated and is not able to capture the humidity from the gas in an efficient manner anymore. Consequently, the at least one adsorption vessel 2 needs to be subjected to a regeneration cycle in which the moisture entrapped therein is removed from said adsorption vessel 2.

For achieving this, the method according to the present can comprise a step in which the pressure dew point or relative humidity is being measured at the outlet 7 of the at least one adsorption vessel 2, during the adsorption cycle.

Preferably, said pressure dew point or relative humidity is being measured at the dryer outlet 5.

Tests have shown that, depending on the volume of said adsorption vessel 2 and on the type of adsorbent material, each adsorption vessel 2 will achieve an optimum pressure dew point or relative humidity after a calculable time interval. Preferably, the measurement of the pressure dew point or relative humidity is performed when such optimum value is reached. As an example, and not limiting to, such optimum value can be reached after 30 minutes, 45 minutes, 1 hour, 1.5 hours or more.

In another embodiment according to the present invention, the measurement of the pressure dew point or relative humidity is performed during an adsorption cycle and an average value for the dew point or relative humidity is being calculated.

Further, the method comprises the steps of stopping the adsorption cycle after a preset adsorption time interval, T1; and subsequently subjecting the adsorption vessel 2 to a first regeneration cycle during a preset minimum heat regeneration time interval, Time3, by heating a regeneration gas prior to directing it through the inlet 6 of the adsorption vessel 2.

In an embodiment according to the present invention, said regeneration gas can be said process gas or said regeneration gas can be a different gas being provided by the same gas source 3 or by a different gas source (not shown).

The method according to the present invention further comprises the step of comparing the measured pressure dew point or relative humidity with a predetermined pressure dew point or relative humidity threshold and if said measured pressure dew point or the relative humidity is higher than said predetermined pressure dew point or relative humidity threshold, the first regeneration cycle is maintained for an additional regeneration time interval, $T_{E1}$.

It goes without saying that, in case the method calculates an average value for the pressure dew point or relative humidity, such calculated value is being compared with a predetermined pressure dew point or relative humidity threshold.

By performing such a step, an optimum regeneration of the adsorbent material within said at least one adsorption vessel 2 is assured.

Tests have shown that, if the load of the at least one adsorption vessel 2 is maintained at approximately 80% load or 60% or lower during the adsorption cycle, the additional regeneration time interval, $T_{E1}$, will decrease more and more with each cycle until reaching zero.

Because of such a behavior, the energy consumption needed for regenerating said adsorption vessel 2 is also decreasing with every regeneration cycle, reaching a value of zero. Accordingly, the efficiency of the regeneration cycle will increase and, at the same time, the costs associated with regenerating the adsorption dryer 1 will decrease.

In the context of the present invention it should be understood that, depending on the measured dew point or relative humidity, the additional regeneration time interval, $T_{E1}$, can subsequently increase and again decrease until reaching a value of zero.

For ease of measurement and/or determination, but not limiting to, the measured parameter is the pressure dew point, which is being further compared with a predetermined pressure dew point threshold.

In another preferred embodiment, said predetermined pressure dew point threshold is selected accordingly to the requirements of the gas at the dryer outlet 5.

In another embodiment according to the present invention, the outlet temperature, temp1, is measured and compared with a predetermined temperature threshold, and, if said measured outlet temperature temp1 is higher than or equal to said predetermined temperature threshold, and, if the time frame in which the adsorption dryer 1 is subjected to said first regeneration cycle is greater than a minimum heat regeneration time interval, $T_{Heat-min}$, then the method comprises the step of stopping said first regeneration cycle.

Tests have proven that, once the temperature of the regeneration gas measured at the outlet 7 of the adsorption vessel 2 reaches a predetermined temperature threshold, the at least one adsorption vessel 2 is regenerated. Said predetermined temperature threshold can be calculated based on the volume of the at least one adsorption vessel 2 and the type of adsorbent material comprised therein.

By maintaining the first regeneration cycle for at least said minimum heat time interval, $T_{Heat-min}$, a safety measurement is being taken and an optimum regeneration of the adsorbent material is being performed.

In another preferred embodiment, the method according to the present invention performs both steps when performing said first regeneration cycle: maintaining the first regeneration cycle for an additional regeneration time interval, $T_{E1}$, if said measured pressure dew point or the relative humidity is higher than said predetermined pressure dew point or relative humidity threshold; and stopping said first regeneration cycle if the outlet temperature, temp1, is higher than or equal to said predetermined temperature threshold, and, if the time frame in which the adsorption dryer 1 is subjected to said first regeneration cycle is greater than a minimum heat regeneration time interval, $T_{Heat-min}$.

By applying both steps, the current state of the adsorbent material is considered and the method according to the present invention is allowed to evolve and adapt accordingly.

In another preferred embodiment, if said measured outlet temperature, temp1, of the regeneration gas is lower than said predetermined temperature threshold and if the time frame in which the adsorption dryer 1 is subjected to said first regeneration cycle is larger than or equal to a maximum heat regeneration time interval, $T_{Heat-Max}$, said first regeneration cycle is stopped.

By stopping the first regeneration cycle after said maximum heat regeneration time interval, $T_{Heat-Max}$, is reached, an efficient functioning of the adsorption dryer 1 is maintained, since long waiting times for starting a subsequent adsorption cycle are avoided and the efficiency of the adsorption dryer is increased.

In a preferred embodiment according to the present invention, the method uses the calculated additional regeneration time interval, $T_{E1}$, in a subsequent first regeneration cycle. Accordingly, in a subsequent regeneration cycle the additional regeneration time interval, $T_{E1}$, is calculated by adding a first predetermined time interval, t0, to a previously set additional regeneration time interval $T_{E1,0}$ wherein said previously set additional regeneration time interval $T_{E1,0}$ is the additional regeneration time interval determined during the previous regeneration cycle.

In the context of the present invention it is to be understood that t0 can be a particular value or can be calculated based on a function having as parameters the measurements performed in a previous regeneration cycle.

It should not be excluded that, a user of the adsorption dryer 1 according to the present invention is able to choose the value of t0, by using the user interface.

For example, and not limiting to, said first predetermined time interval, t0, can be approximately 15 minutes, or approximately 30 minutes, or approximately 45 minutes or more.

Preferably, when the adsorption dryer 1 is started, the previously set additional regeneration time interval $T_{E1,0}$ is zero.

In another embodiment according to the present invention, if said measured pressure dew point or relative humidity is not higher than said predetermined pressure dew point or relative humidity threshold, the method further comprises the step of comparing said measured pressure dew point or relative humidity with a second pressure dew point or relative humidity threshold and, if the measured pressure dew point or relative humidity is lower than a second pressure dew point or relative humidity threshold, the present method preferably further comprises the step of maintaining the regeneration cycle for a second additional regeneration time interval, $T_{E2}$, wherein said second predetermined pressure dew point or relative humidity threshold is lower than the first predetermined pressure dew point or relative humidity threshold.

Preferably, the method according to the present invention will apply either the additional regeneration time interval, $T_{E1}$, or the second additional regeneration time interval, $T_{E2}$, in the subsequent regeneration cycle, depending on the result of the comparison.

Preferably, but not limiting to, said second additional regeneration time interval, $T_{E2}$, is smaller than the additional regeneration time interval, $T_{E1}$.

In yet another preferred embodiment, said second additional regeneration time interval, $T_{E2}$, has a negative value. In other words, if the measured pressure dew point or relative humidity is lower than a second pressure dew point or relative humidity threshold, a subsequent first regeneration cycle will be with $|T_{E2}|$ shorter than the previous one, wherein $|T_{E2}|$ represents the absolute number of $T_{E2}$.

Preferably, the difference between the measured pressure dew point or relative humidity and the second pressure dew point or relative humidity threshold is a tolerance that the method takes into account before the first regeneration cycle is being prolonged.

Said tolerance can be any selected value, depending on the required results of the adsorption dryer 1 and the behavior of the adsorbent material. For example, such tolerance can be a value selected between 1° and 10°, such as approximately 5°.

Preferably, the second additional regeneration time interval, $T_{E2}$, is calculated by adding a second predetermined time interval, t1, to a previously set time interval $T_{E2,0}$, wherein said previously set additional regeneration time interval $T_{E2,0}$ is the second additional regeneration time interval determined during the previous regeneration cycle.

In the context of the present invention it is to be understood that t1 can be a particular value or can be calculated based on a function having as parameters the measurements performed in a previous regeneration cycle.

It should not be excluded that, a user of the adsorption dryer 1 according to the present invention is able to choose the value of t1, by using the user interface.

For example, and not limiting to, said second predetermined time interval, t1, can be approximately 15 minutes, or approximately 30 minutes, or approximately 45 minutes or more.

In the context of the present invention it should be understood that said second predetermined time interval, t1, can also be a negative time interval, case in which time is subtracted.

Preferably, when the adsorption dryer 1 is started, the previously set additional regeneration time interval $T_{E2,0}$ is zero.

The method according to the present invention can further comprise the step of recalculating said predetermined minimum heat regeneration time interval, $T_{Heat-min}$, by adding said additional regeneration time interval, $T_{E1}$, to a predetermined minimum time interval, Time3; or by adding said second additional regeneration time interval, $T_{E2}$, to said predetermined minimum heat regeneration time interval Time 3.

Preferably, said predetermined minimum heat regeneration time interval Time 3 is selected through design.

In a further embodiment according to the present invention, the method further comprises the step of calculating a maximum heat regeneration time interval in which the regeneration cycle can be maintained, $T_{Heat-Max}$, by adding said additional regeneration time interval, $T_{E1}$, to a preset maximum heat regeneration time interval, Time4; or by adding said second additional regeneration time interval, $T_{E2}$, to said preset maximum heat regeneration time interval, Time4.

Preferably, said preset maximum heat regeneration time interval, Time 4 is selected through design.

Because the minimum heat regeneration time interval, Time 3, and the maximum heat regeneration time interval, Time 4, are being selected through design, an adsorption dryer implementing the present method will follow a well-defined pattern during its functioning, and will eliminate the risk of having a lower than requested quality of the gas provided at the dryer outlet 5 or of encountering long waiting time intervals between subsequent adsorption cycles.

Preferably, the adsorption dryer 1 is subjected to a second regeneration cycle, by maintaining the flow of process gas through the dryer inlet 4, for a preset minimum regeneration time interval, Time1.

By maintaining the flow of process gas through the dryer inlet 4, an adsorption dryer 1 implementing the method according to the present invention uses the source of gas 3 during part of the regeneration cycle of an adsorption vessel 2, without the influence of the heated gas, for reducing even more the energy consumption.

In a further embodiment, the previously calculated $T_{E1}$ $T_{E2}$, are used to recalculate the minimum regeneration time interval in which the flow of process gas is maintained at the dryer inlet 4, $T_{min}$, by: subtracting said additional regeneration time interval, $T_{E1}$ from said preset minimum regeneration time interval, Time1, or by: subtracting said second additional regeneration time interval, $T_{E2}$, from said preset minimum regeneration time interval, Time1. Accordingly, the pressure dew point or relative humidity measurement constitutes a basis for adjusting the time intervals in which both regeneration cycles are being performed: the first regeneration cycle and the second regeneration cycle.

Further, the method can further comprise the step of calculating a maximum regeneration time interval, $T_{Max}$, in which the flow of process gas is maintained at the dryer inlet 4, by subtracting said additional regeneration time interval, $T_{E1}$, from a predetermined maximum time interval, Time2, or by subtracting said second additional regeneration time interval, $T_{E2}$, from said preset maximum regeneration time interval, Time2.

Preferably, the adsorption dryer 1 is first subjected to the second regeneration cycle and then to the first regeneration cycle. Because of this, the adsorption dryer 1 uses the properties of the regeneration gas as much as possible and only when this is not sufficient, it will use the heated gas. Tests have shown that, when the at least one adsorption vessel 2 is maintained at for example at approximately 80% load or 60% load or less during the adsorption cycle, and once the time interval in which the heated gas is used reaches a zero value, because of the present method, the zero value will be maintained.

Depending on the requirements of the adsorption dryer 1, it can be provided with at least two adsorption vessels 2 and the first regeneration cycle and the second regeneration cycle are applied to each adsorption vessel 2 alternatively.

By doing this, each adsorption vessel 2 will be treated individually, and depending on the current state of each adsorption vessel 2, the method regulates the time intervals in which the first regeneration cycle and the second regeneration cycle are performed, such that an optimum result is achieved.

Accordingly, even if one of the at least two adsorption vessels 2 is subjected to a process gas with a higher level of humidity, the method according to the present invention will regulate the time intervals individually for each adsorption vessel 2, such that an optimum regeneration of the adsorbent material will be performed, at the lowest cost and within an optimum period of time.

In the context of the present invention it should be understood that the number of adsorption vessels 2 can vary and that the method of the present invention can be equally applied to an adsorption dryer 1 comprising more than two adsorption vessels 2, such as for example three adsorption vessels, four adsorption vessels or more.

Preferably, the method according to the present invention further comprises the step of subjecting the at least one adsorption vessel 2 to a cooling cycle wherein said process gas is cooled by means of a cooler 8. By doing this, the temperature of the gas provided through the dryer outlet 5 will be controlled according to the requirements.

Preferably, after the regeneration cycles are performed, the at least one adsorption vessel 2 of the adsorption dryer 1 is preferably maintained in standby. By performing this step, each adsorption vessel 2 is maintained ready to start a new adsorption cycle possibly before such a request is even retrieved. Because of this, the response time of the adsorption dryer 1 implementing a method according to the present invention is reduced to a minimum.

Preferably, when the adsorption vessel 2 is maintained in standby, the flow of gas through the inlet 6 is stopped and the flow at the dryer outlet 5 is maintained, such that a minimum pressure is maintained within the adsorption vessel 2.

In a preferred embodiment according to the present invention, but not limiting to, the method applies the following steps for each of the at least one adsorption vessel 2 in the following order: first one of the adsorption vessels 2 is subjected to a second regeneration cycle, then the same adsorption vessel 2 is preferably subjected to a first regeneration cycle, then the same adsorption vessel 2 is preferably subjected to a cooling cycle and afterwards is preferably maintained in standby. During the cooling cycle, the gas coming from the gas source 3 is preferably cooled by means of a cooler 8.

Even more preferably, for controlling the temperature of the regeneration gas flowing through the dryer outlet 5, the regeneration gas flowing through the at least one adsorption vessel 2, after leaving said at least one adsorption vessel 2, is cooled by means of the same or a different cooler 8 during both first regeneration cycle and second regeneration cycle.

Even more preferably, said cooler 8 is further used during the adsorption phase for controlling the process gas flowing through said dryer outlet 5.

For clarity's sake, the functioning principle will be further explained with reference to the accompanying drawings.

It should be understood that the following examples explain different working states of the adsorption dryer and that the method for regulating the regeneration time as described in the present paper is applicable during the regeneration cycles of each example that will be further explained.

It should be understood that the adsorption dryer can work with a different configuration as well, and the following section should not be considered limiting for the design.

Figure 2:
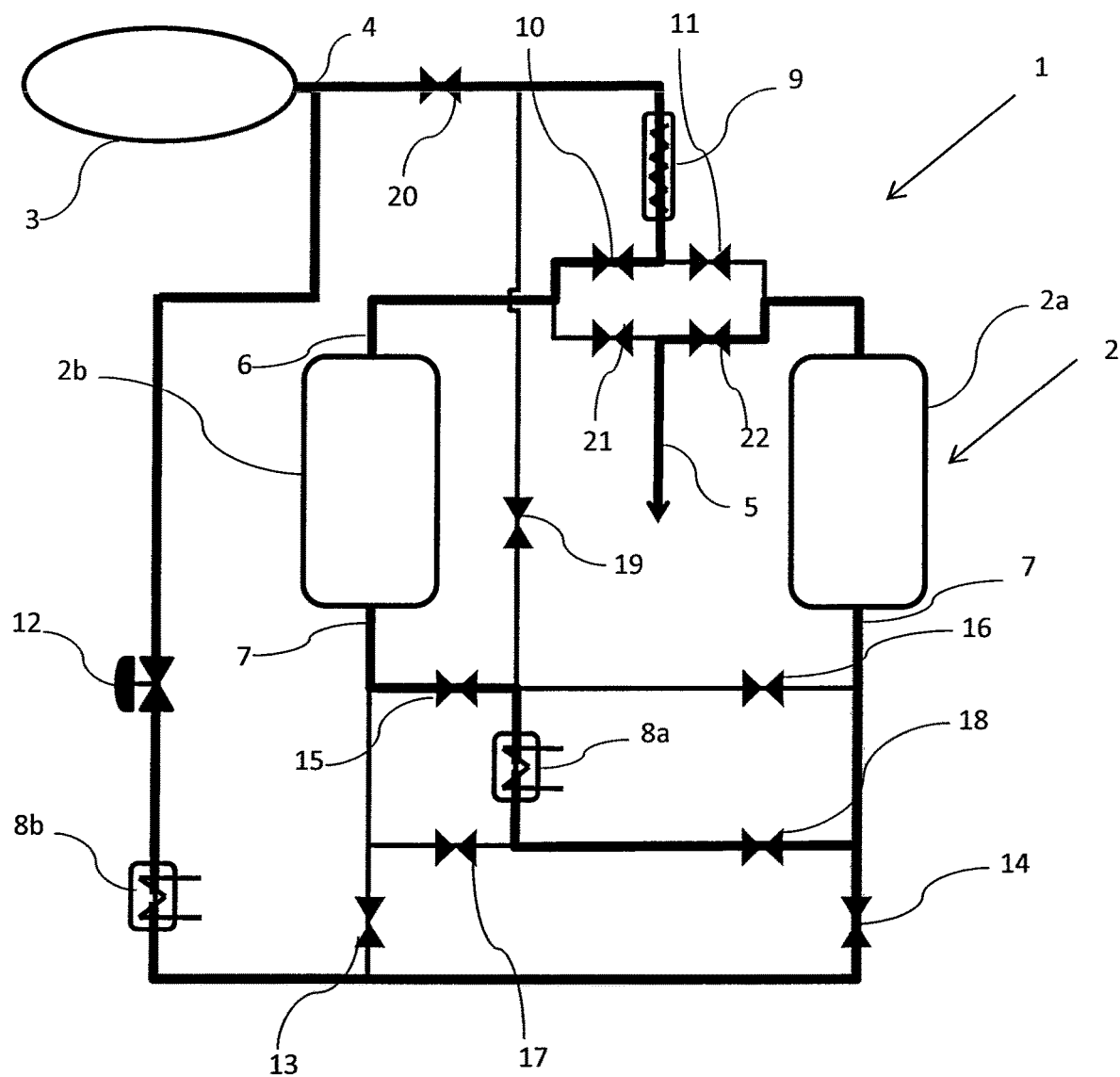
FIGS. 2 to 7 schematically illustrate the working principle of a device according to FIG. 1.

FIG. 2 illustrates an example of an adsorption dryer 1 comprising at least two adsorption vessels 2a and 2b, wherein while one adsorption vessel 2b is subjected to a second regeneration cycle, the second adsorption vessel 2a is subjected to an adsorption cycle.

Accordingly, the gas from the outlet of the compressor 3 is allowed to flow through the cut-off valve 20 and through valve 10, reaching the adsorption vessel 2b. The control valve 19, inlet valve 11 and outlet valve 21 are preferably brought in a closed state by the controller unit C.

After the flow of gas leaves the adsorption vessel 2b, is directed through control valve 15, through cooler 8a, where it is cooled. The flow of cooled gas is further directed through control valve 18 and further through adsorption vessel 2a, wherein moisture is adsorbed before leaving the adsorption dryer 1 though outlet valve 22 and dryer outlet 5.

In this example, regulating valve 12 is preferably brought into a partial open state, such that a volume of gas from the outlet of the compressor 3 reaches the cooler 8b, under the influence of which it is cooled, flows through the two-way valve 14 and reaches the adsorption vessel 2a. The two way valve 13 is preferably brought into a closed state.

The gas flow reaches the dryer outlet 5 and is further used in an external network. For this to happen, the inlet valve 11 is preferably brought in closed state.

Preferably, adsorption vessel 2b is in the second regeneration phase, wherein the heat of the compressed gas is used to remove moisture from the adsorbent medium, and the adsorption vessel 2a is in adsorption phase.

As an example, the regulating valve 12 can be controlled by the controller unit C such that approximately 50% of the compressed gas is allowed to reach the heater 9 and approximately 50% of the compressed gas is allowed to reach the cooler 8b.

Another effect of opening the regulating valve 12 is to control the pressure drop through the adsorption dryer 1 and accordingly through adsorption vessels 2a and 2b.

In a subsequent step, the adsorption vessel 2b can be subjected to a first regeneration cycle, wherein the flow of gas follows the same path as previously explained with reference to FIG. 2, with the difference that heater 9 is switched on by the controller unit C.

Another possible difference is to regulate the degree of openness of the regulating valve 12, such that the volume of compressed gas reaching the heater 9 is controlled. Preferably, the degree of openness of the valve 12 is increased when compared with the previous example, such that the heater 9 will increase more easily the temperature of the compressed gas and/or would possibly achieve a higher temperature of said compressed gas before being directed through the adsorption vessel 2b.

As an example, the regulating valve 12 can be controlled by the controller unit C such that approximately 30% of the compressed gas is allowed to reach the heater 9 and approximately 70% of the compressed gas is allowed to reach the cooler 8b.

Figure 3:
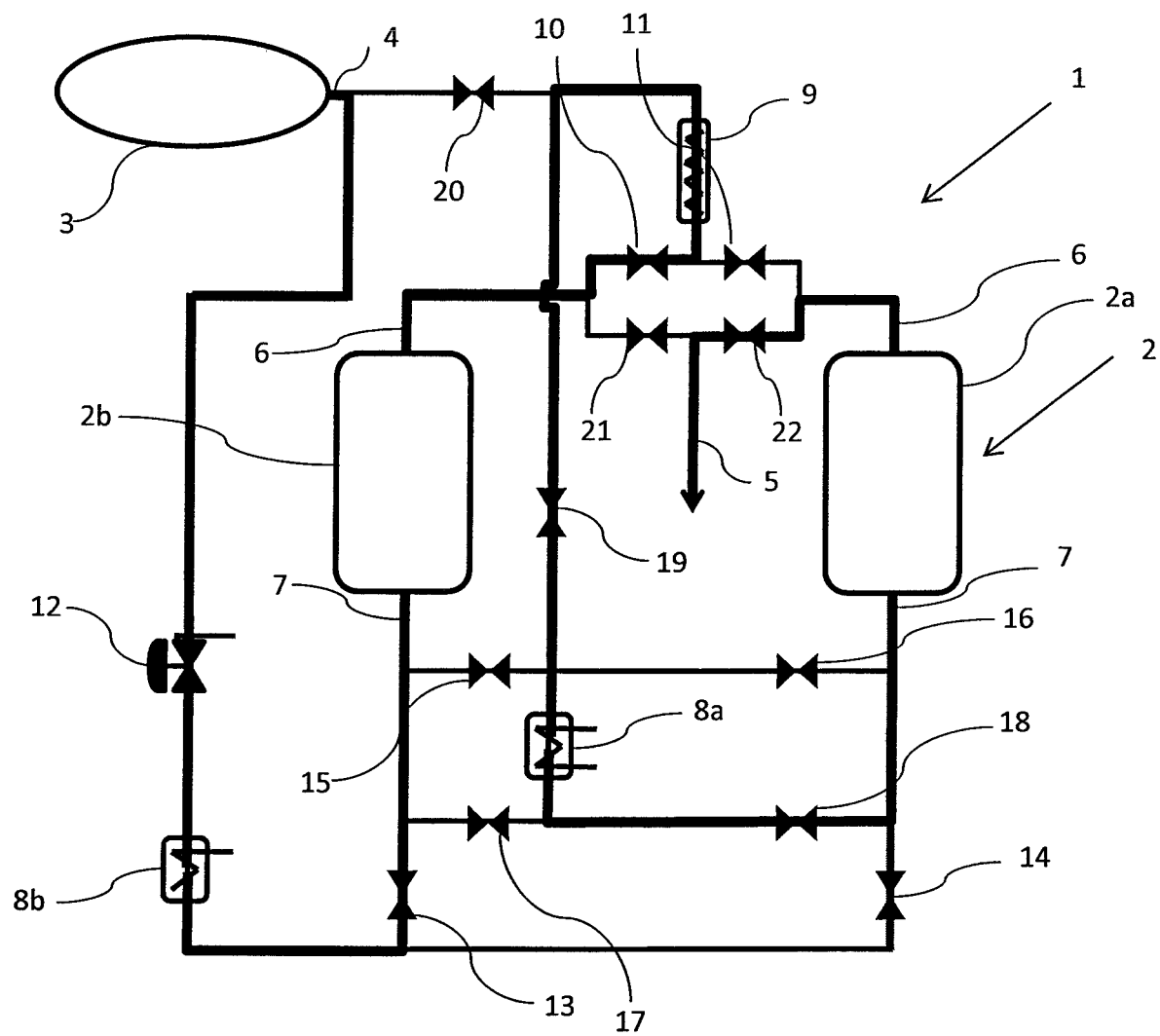

FIG. 3 illustrates an example wherein while one adsorption vessel 2b is subjected to a cooling cycle, the other adsorption vessel, 2a, is subjected to or maintained in an adsorption cycle.

After the adsorption vessel 2b has been subjected to a second regeneration cycle and a first regeneration cycle, the temperature within said adsorption vessel 2b reaches high values and is preferably cooled down. For achieving this, the adsorption dryer 1 uses cooler 8b.

Accordingly, the compressed gas is directed through the regulating valve 12, through cooler 8b where it is cooled, further though the two-way valve 13 and into the adsorption vessel 2b.

Preferably, the cut-off valve 20, the control valves 17 and 15 are brought into a closed state.

The gas flowing though the adsorption vessel 2b will reach a higher temperature and because of this it will be directed through inlet valve 10, and control valve 19 through the cooler 8a.

In this example, the heater 9 is switched off, the inlet valve 11 and outlet valve 21 are brought into a closed state.

After the gas is being cooled by cooler 8a, the flow is directed through control valve 18, into the adsorption vessel 2a wherein moisture is adsorbed from said gas before being guided through the outlet valve 22 and through the dryer outlet 5 into an external network.

Preferably, the two-way valve 14 and the control valve 16 are brought into a closed state.

As an example, the regulating valve 12 can be controlled by the controller unit C such that approximately 100% of the volume of gas from the compressor 3 is directed through the cooler 8b.

Figure 4:
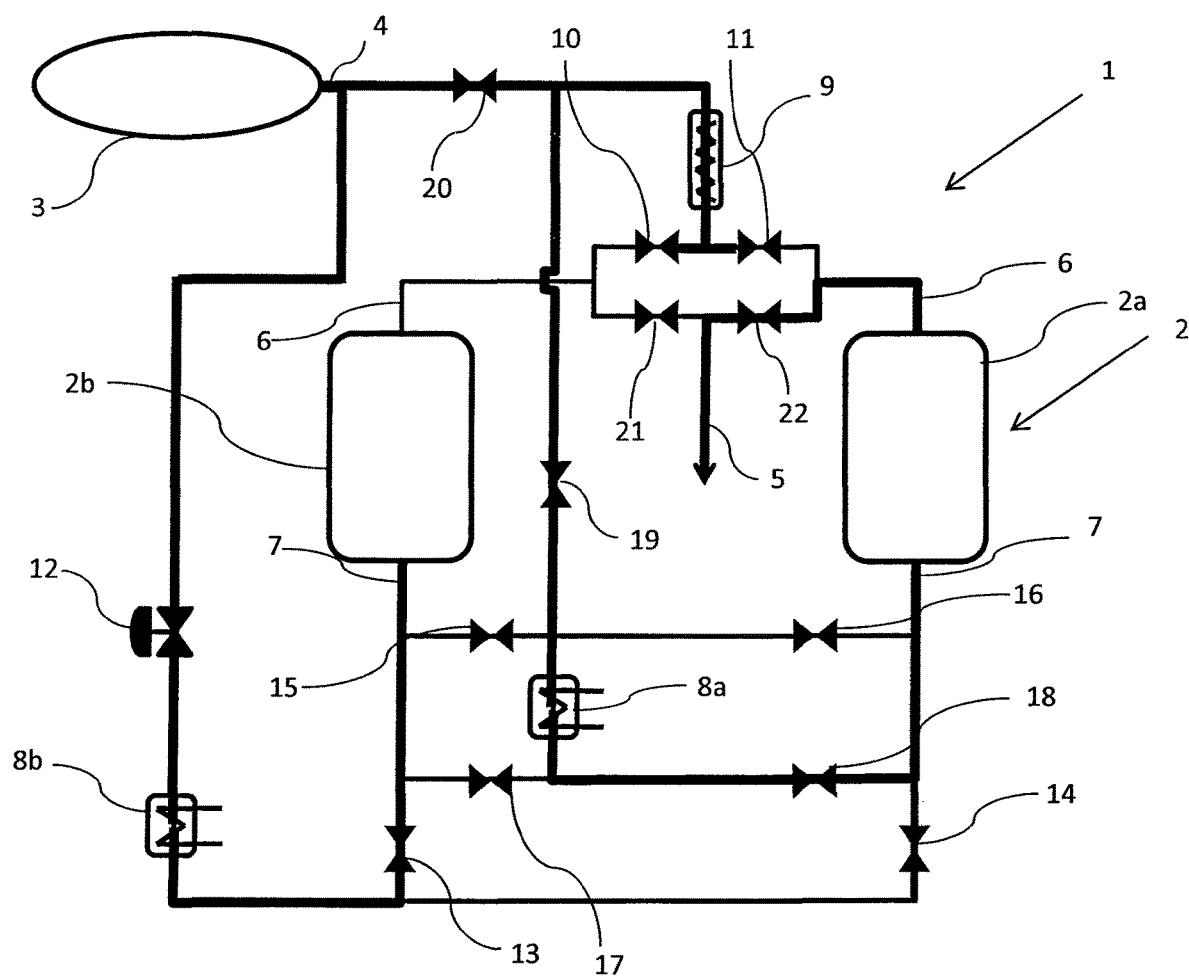

FIG. 4 illustrates an example in which one adsorption vessel, 2b, is in standby and the other adsorption vessel, 2a, is in adsorption.

In this example, the air coming from the compressor 3 is preferably allowed to flow through the regulating valve 12 and though the control valve 19.

After passing the regulating valve 12, the air is cooled by the cooler 8b, part of it reaches the outlet of the adsorption vessel 2b, through the two-way valve 13 and part of it reaches the outlet of the adsorption vessel 2a through the two way valve 14. Preferably, the control valves 15 and 17, the inlet valve 10 and the outlet valve 21 are brought into a closed state.

Because part of the cooled air reaches the outlet of the adsorption vessel 2b and because inlet valve 10 and outlet valve 21 are brought into a closed state, a minimum desired pressure is maintained into the adsorption vessel 2b such that, when such adsorption vessel is subjected to an adsorption cycle, the adsorption dryer 1 does not experience a significant pressure drop.

Further, the compressed air flowing through control valve 19 reaches the cooler 8a wherein it is cooled and reaches the outlet of the adsorption vessel 2a through control valve 18. As it passes through said adsorption vessel 2a, moisture is adsorbed. Further the cooled and dry air is directed through outlet valve 22 into the external network.

Preferably, inlet valve 11 is also brought into a closed state, such that the air coming from the compressor 3 is only allowed to flow through the regulating valve 12 and control valve 19. In this example, the heater 9 is preferably maintained in a switched off state.

For efficiency purposes and because, during this stage a minimum pressure is desired to be maintained in adsorption vessel 2b, the opening of the regulating valve will be controlled such that a minimum volume of compressed air is allowed to reach the cooler 8b and further, the adsorption vessel 2b, such as, for example: 40% or less from the volume of compressed air, or, preferably 30% or less from the volume of compressed air, or, even more preferably, 25% or less from said volume of compressed air.

Figure 5:
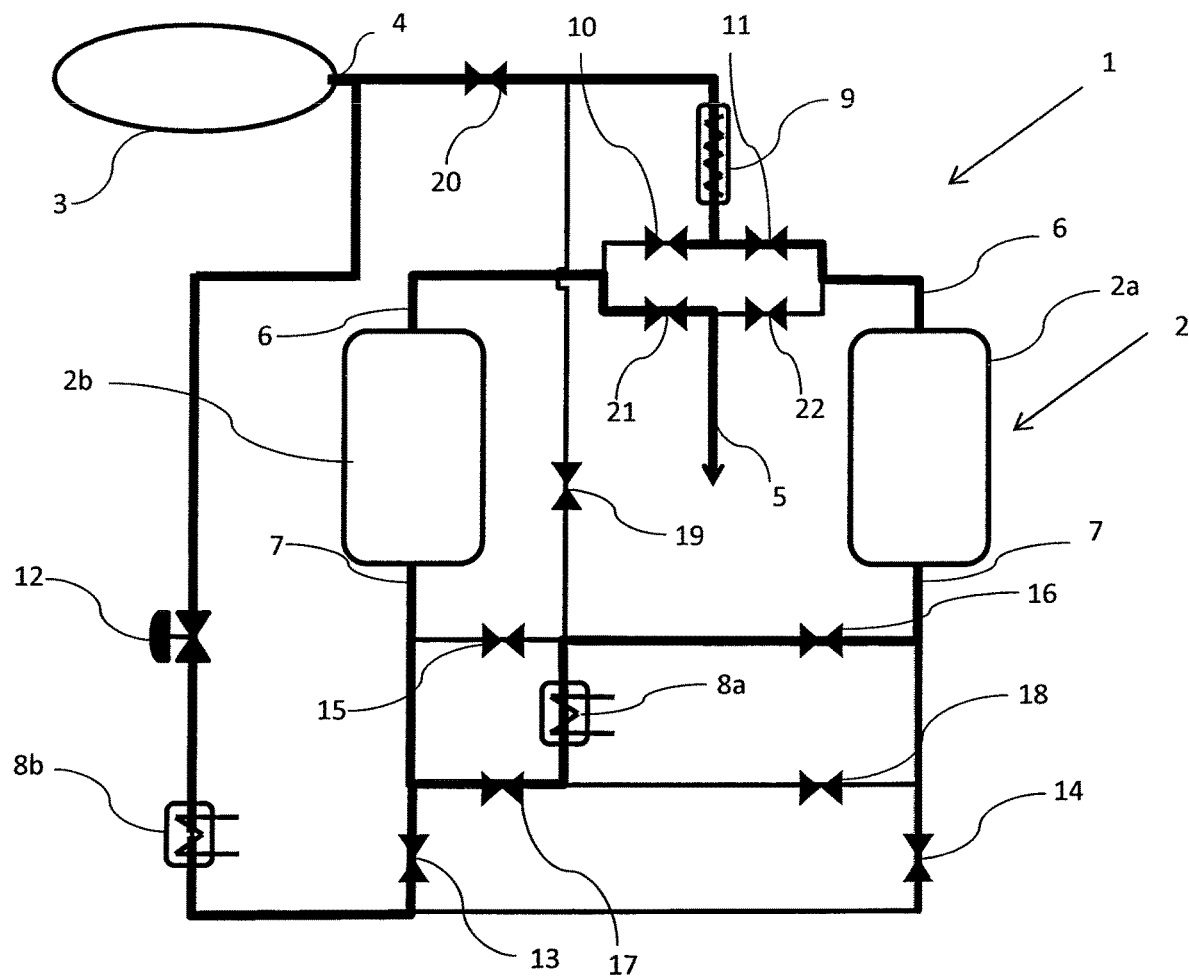

FIG. 5 illustrates an example in which adsorption vessel 2b is in an adsorption phase and adsorption vessel 2a is in a second regeneration phase.

In this example, the air coming from the compressor unit 3 is preferably allowed to flow though the regulating valve 12 and through the inlet valve 11 and further reach the adsorption vessel 2a.

Preferably, the heater 9 is switched off, control valve 19, inlet valve 10 and outlet valve 22 are brought into a closed state.

Because the air coming from the compressor 3 is warm due to the compression process, it will regenerate said adsorption vessel 2a. After leaving the adsorption vessel 2a, the air is directed through cooler 8a wherein it is cooled and further through the adsorption vessel 2b since control valve 17 is brought into an open state. Preferably, control valves 14, 15 and 18 are brought into a closed state.

Further, the air flowing through the regulating valve 12 is further directed through the cooler 8b wherein it is cooled and is further directed through the two-way valve and further through the adsorption vessel 2b. The moisture from the cooled air flowing through said adsorption vessel 2b is adsorbed and the cooled and dry air is guided to the external network through outlet valve 21 and dryer outlet 5.

Preferably, the regulating valve 12 is controlled such that part of the air coming from the compressor 3 is guided through valve 12 and reach the cooler 8b, and the rest is guided through cut-off valve 20 and further through adsorption vessel 2a.

As an example, the regulating valve 12 can be controlled by the controller unit C such that approximately 50% of the compressed gas is allowed to reach adsorption vessel 2a and approximately 50% of the compressed gas is allowed to reach the cooler 8b.

In a subsequent step, adsorption vessel 2a can be subjected to a first regeneration cycle, wherein the flow of air is maintained as in the previous example, and wherein the heater 9 is switched on by the controller unit C.

For a better efficiency, the regulating valve 12 can be controlled such that a bigger volume of air reaches the cooler 8b and further the adsorption vessel 2b, and a smaller volume of air is allowed to reach the heater 9.

As an example, the regulating valve 12 can be controlled by the controller unit C such that approximately 30% of the compressed gas is allowed to reach the heater 9 and approximately 70% of the compressed gas is allowed to reach the cooler 8b.

Figure 6:
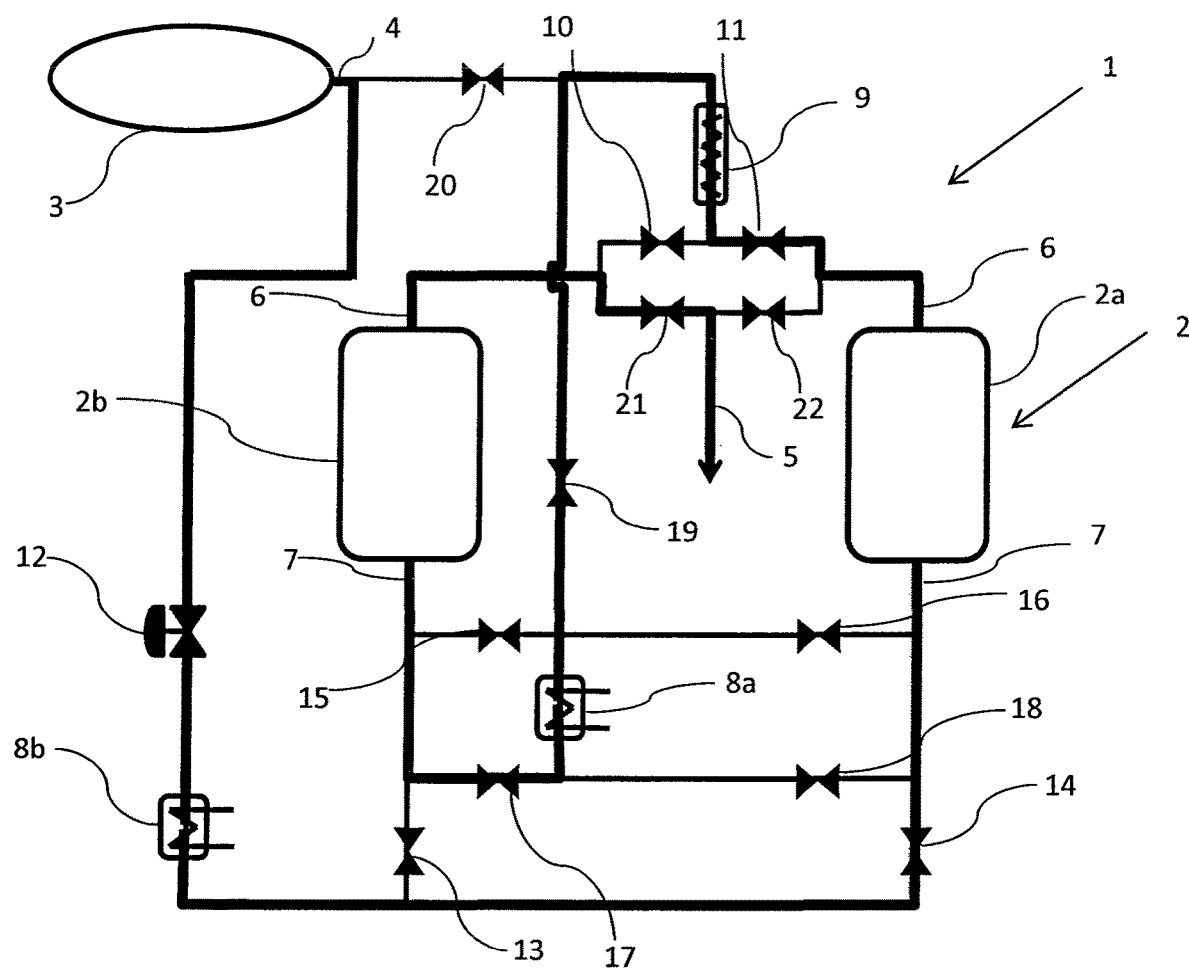

FIG. 6 illustrates an example in which adsorption vessel 2a is subjected to a cooling cycle and adsorption vessel 2b is maintained in an adsorption cycle.

In this example, the cut-off valve 20 is preferably brought into a closed state such that the air coming from the compressor 3 is guided through the regulating valve 12 and further through the cooler 8b wherein it is cooled.

The cooled air is further directed through the two-way valve 14 and further through the adsorption vessel 2a wherein heat entrapped within said adsorption vessel 2a is transferred through the gas flowing therethrough. Preferably, the two-way valve 13, control valves 16 and 18 are brought into a closed state.

The air leaving the adsorption vessel 2a is guided through inlet valve 11 and control valve 19 through the cooler 8a, wherein the air is cooled. Preferably, outlet valve 22, inlet valve 10 and control valve 15 are brought into a closed state.

After the air is cooled by said cooler 8a, it is further directed through control valve 17 through adsorption vessel 2b wherein moisture is adsorbed. The air leaving the adsorption vessel 2b is further directed to the external network through outlet valve 21.

For a better efficiency, the regulating valve 12 is preferably controller such that approximately the entire volume of compressed gas coming from the compressor 3 is guided therethrough.

Figure 7:
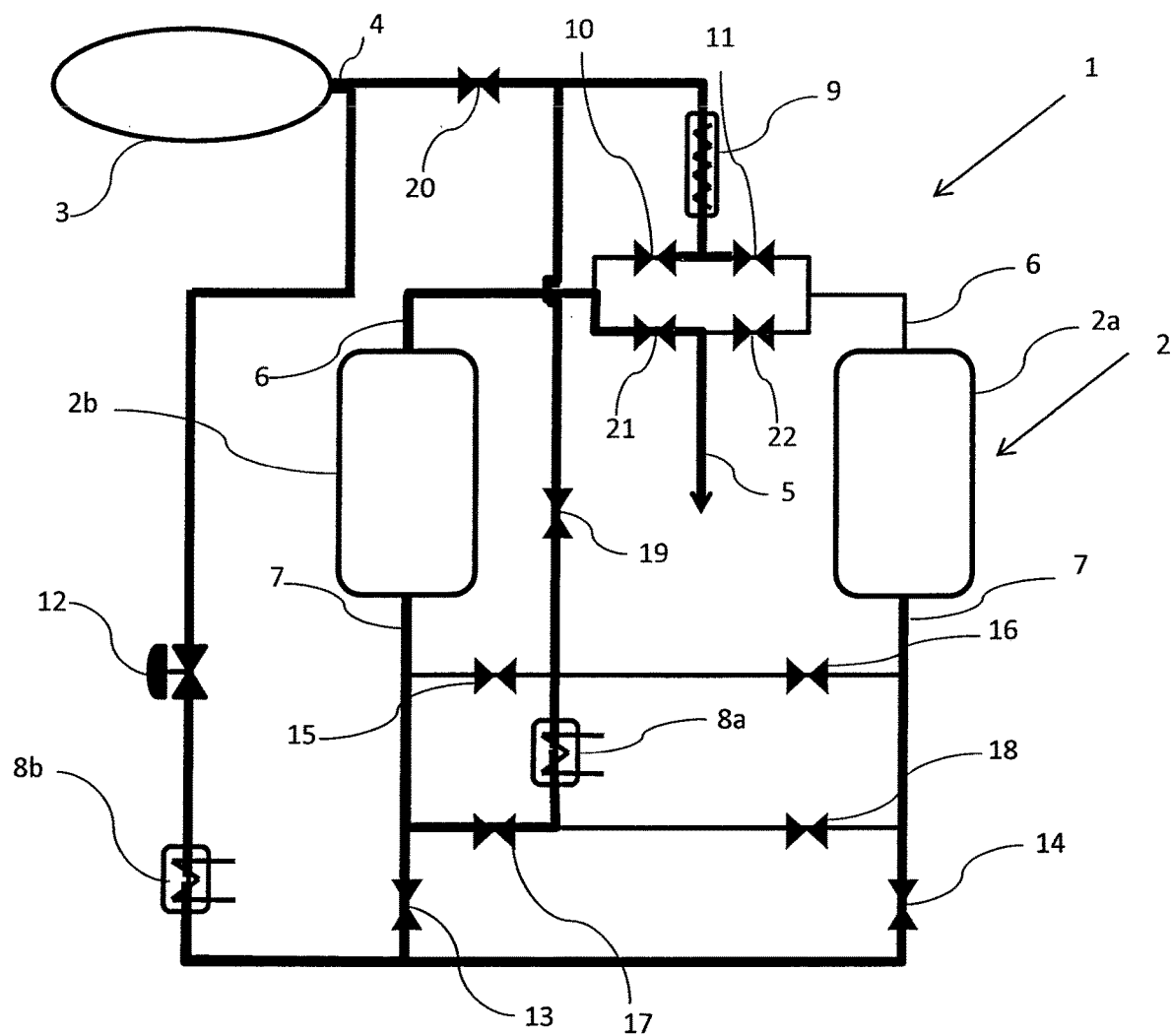

FIG. 7 illustrates an example in which adsorption vessel 2a is in standby and adsorption vessel 2b is maintained in an adsorption cycle.

In this example, the air coming from the compressor 3 is guided through the regulating valve 12 and through the control valve 19 to reach cooler 8b and 8a respectively, wherein the two flows are cooled.

Preferably, inlet valves 10 and 11 and outlet valve 22 are brought into a closed state.

Part of the air flowing through the regulating valve 12 and further cooled by cooler 8b is guided through the adsorption vessel 2b through the two-way valve 13 and part of it is brought at the outlet of the adsorption vessel 2a with the help of the two way valve 14 which is brought into an open state.

Further the air flowing through cooler 8a is guided through adsorption vessel 2b, since control valve 17 is preferably brought into an open state.

Further preferably, control valves 15, 16 and 18 are brought into a closed state.

The air leaving the adsorption vessel 2b is guided to the external network through outlet valve 21.

Because part of the cooled air is brought to the outlet of the adsorption vessel 2a, a minimum pressure level is maintained through said adsorption vessel 2a such that, when the adsorption vessel 2a is subjected to an adsorption cycle, a pressure drop within the adsorption dryer 1 is very small or even eliminated.

Figure 8:
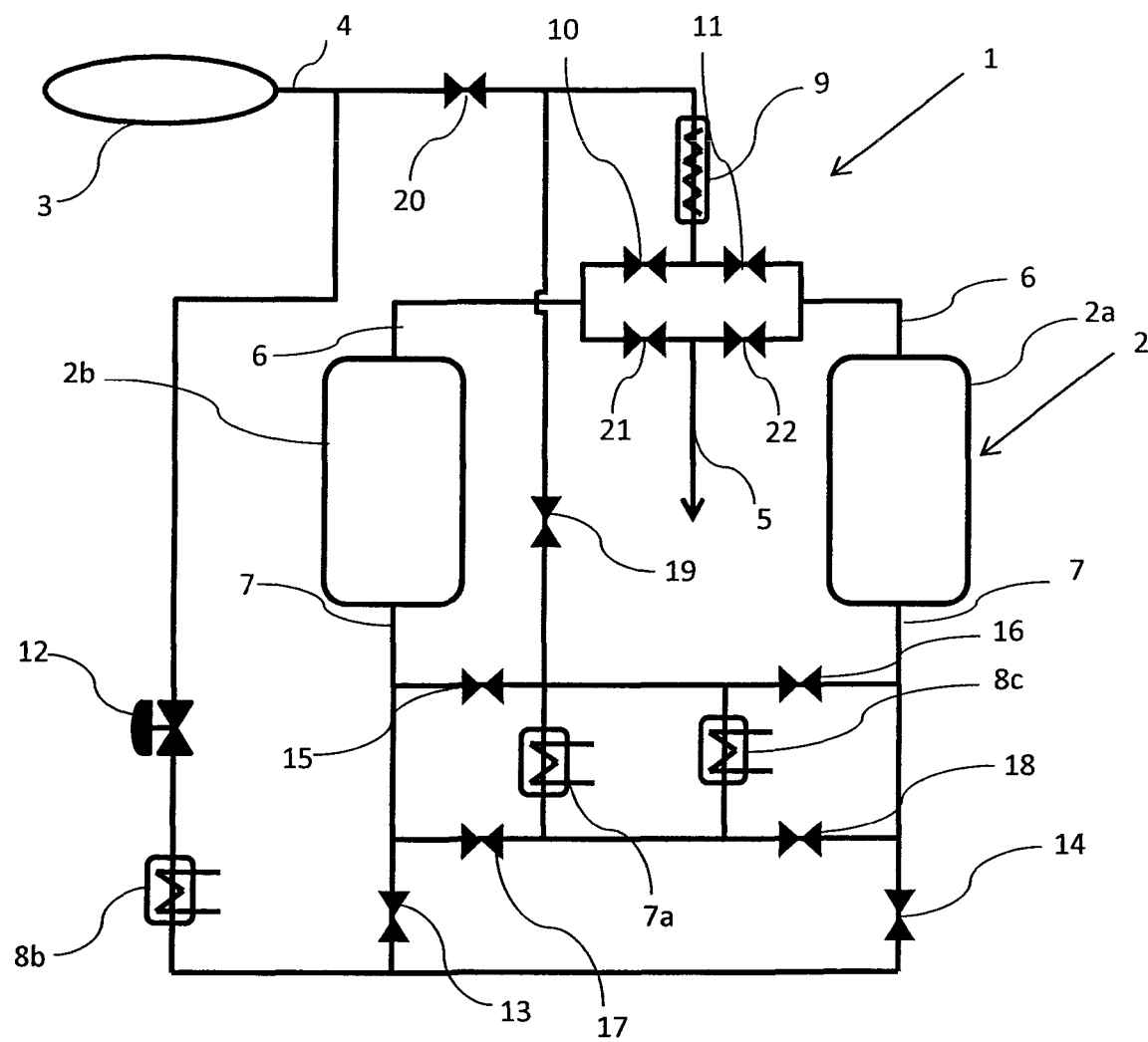
FIGS. 8 to 23 illustrate different embodiments of an adsorption dryer according to the present invention.

FIG. 8 shows another possible embodiment of an adsorption dryer according to the present invention, wherein an additional cooler 8c is included. The working principle remains the same as in the above described examples.

The only difference is that instead of using only cooler 8a, the adsorption dryer will make use of two coolers 8a and 8c, mounted in parallel. Accordingly, the flow of gas previously reaching cooler 8a will be reduced in half, which will increase even more the efficiency of the cooling process.

Figure 9:
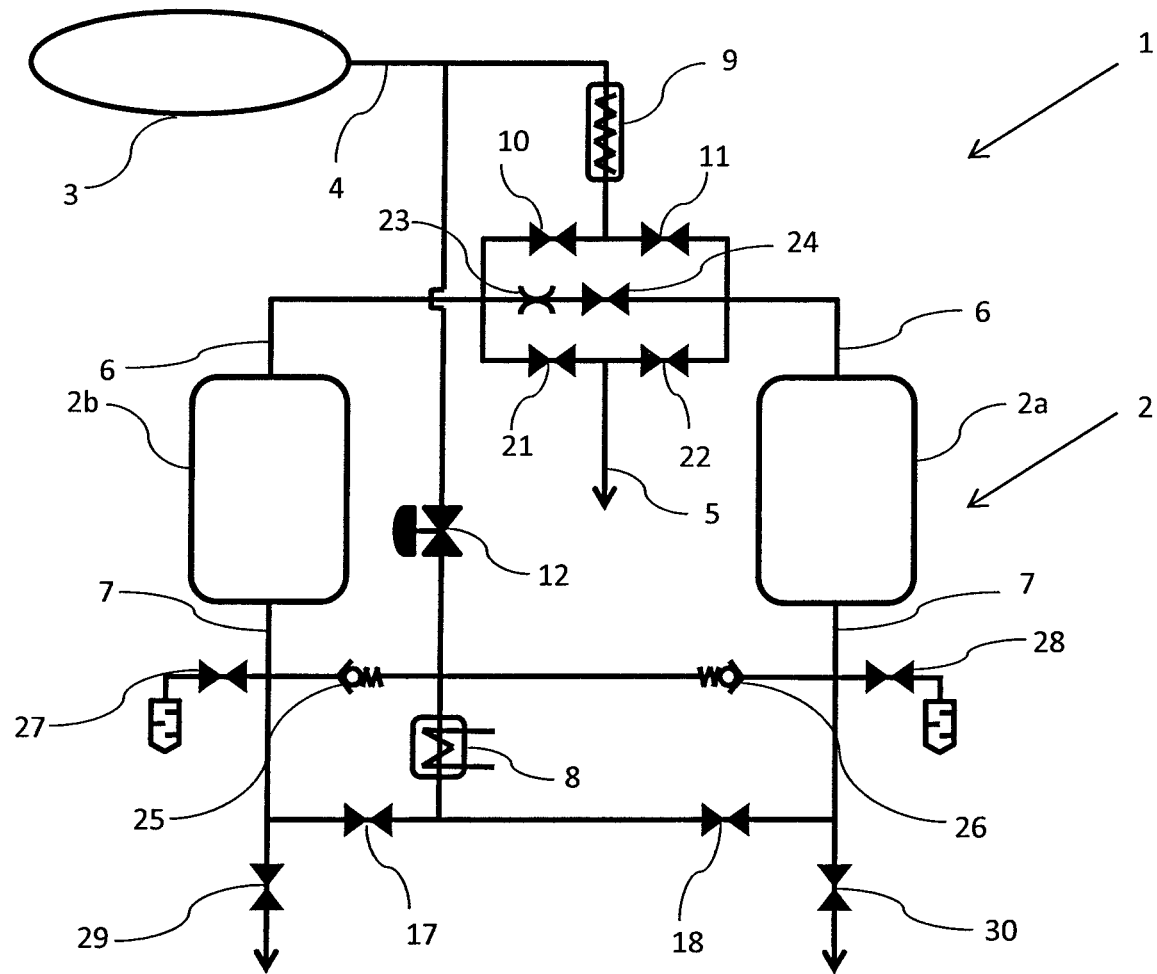

FIG. 9 illustrates another example of a dryer 1 according to the present invention in which a volume of gas is used for cooling down each of the two adsorption vessels 2. Said volume of gas will be referred to as the purge gas.

The layout of the adsorption dryer 1 illustrated in FIG. 9 differs from the one of FIG. 1 in that the adsorption dryer 1 uses a nozzle 23 and a purge valve 24 for controlling the volume of purge gas and when such purge gas will be used.

Another difference is that control valves 15 and 16 have been replaced with one way valves 25 and 26. It should be however understood that control valves 15 and 16 could have also been used in this specific example, however, by using one way valves 25 and 26, the control unit does not need to actuate them anymore and the flow regulation will be done based on the pressure difference within the conduits on which said one way valves 25 and 26 are mounted.

The adsorption dryer 1 further uses pressure relief valves 27 and 28 for controlling the pressure within the adsorption vessels 2a and 2b and allowing the pressure build within said adsorption vessels 2a and 2b to be evacuated into the atmosphere or the outside environment.

Further, extract valves 29 and 30 are being used for allowing a volume of gas to leave the adsorption dryer 1 into the atmosphere or the outside environment.

Figure 10:
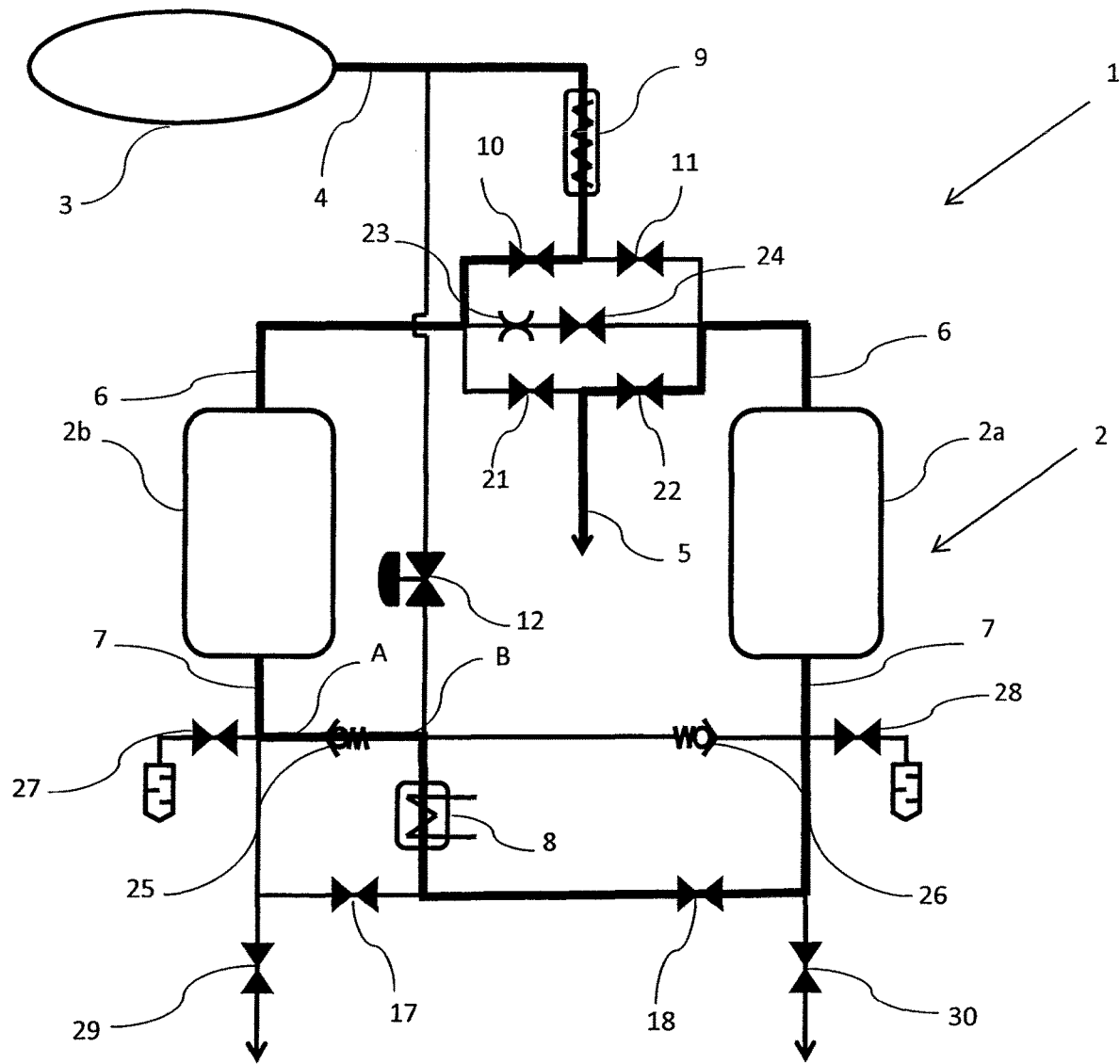

FIG. 10 illustrates the situation in which adsorption vessel 2b is in a second regeneration cycle and adsorption vessel 2a is in an adsorption cycle.

In such a working state, the regeneration gas flowing through the dryer inlet 4 and coming from the compressor 3, having a relatively high temperature is directed through adsorption vessel 2b, is subsequently cooled down by cooler 8 and guided through adsorption vessel 2a and further through the dryer outlet 5 to the external network.

Accordingly inlet valve 10, control valve 18 and outlet valve 22 are open and inlet valve 11, outlet valve 21, purge valve 24, the regulating valve 12, the pressure relief valves 27 and 28, control valve 17, extract valves 29 and 30, are maintained closed.

Because the pressure level at the level of conduit A is higher than the pressure level at the level of conduit B, the one way valve 25 opens and allows the gas flow to reach the cooler 8.

Figure 11:
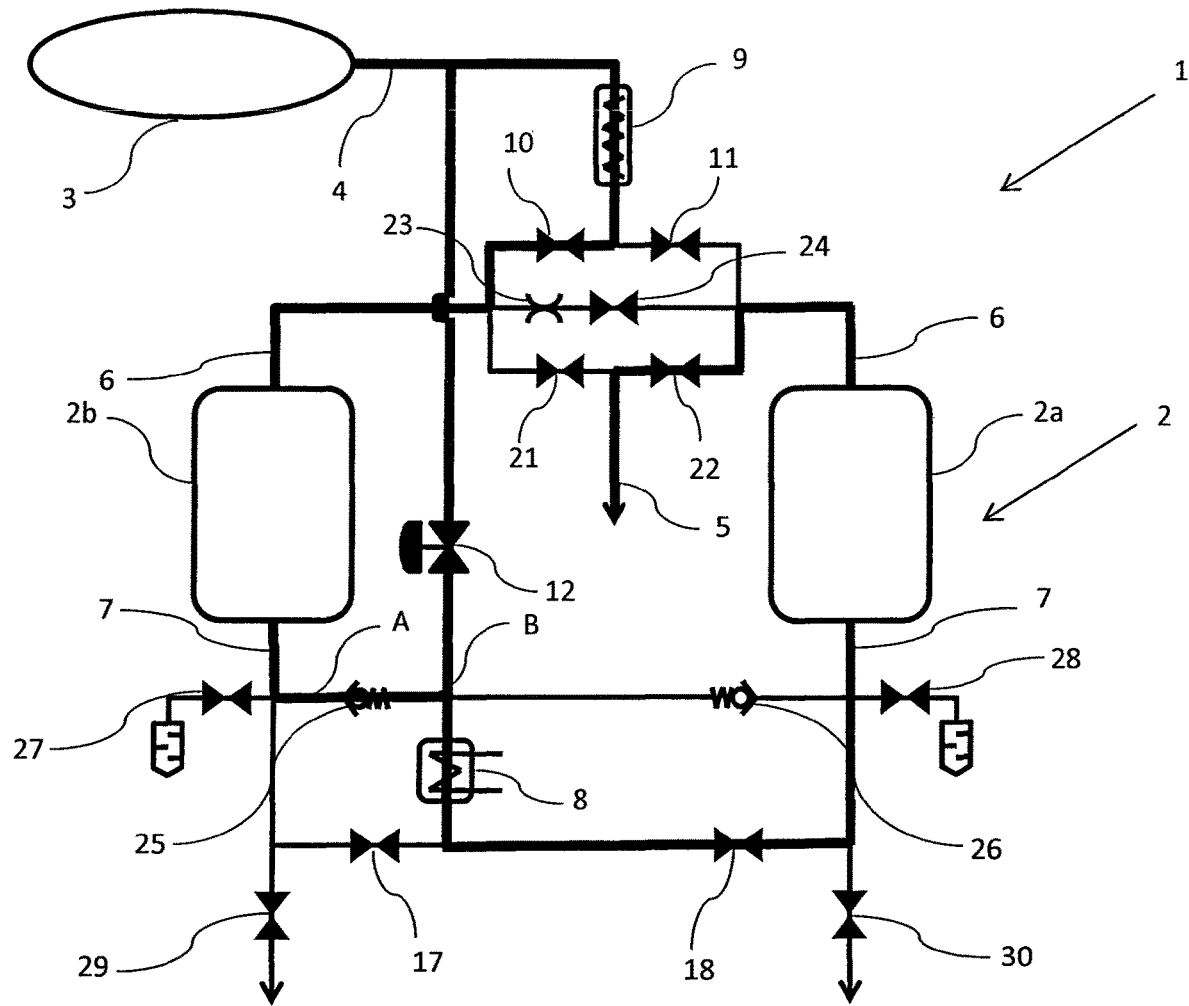

FIG. 11 illustrates the working state in which adsorption vessel 2b is subjected to a first regeneration cycle, in which heater 9 is switched on and adsorption vessel 2a is in an adsorption cycle.

In such a working state, part of the gas flowing through the dryer inlet 4 and coming from the compressor 3 reaches the heater 9 which increases the temperature even more, is guided through adsorption vessel 2b, the flow of gas is subsequently cooled by cooler 8 and is further guided through adsorption vessel 2a and further through the dryer outlet 5 to the external network.

Preferably, the regulating valve 12 is partially open. Even more preferably, the regulating valve 12 allows approximately 80% of the gas flow to flow though it and only approximately 20% of the gas flow to reach the heater 9.

Accordingly, inlet valve 10, regulating valve 12, control valve 18 and outlet valve 22 are open and inlet valve 11, outlet valve 21, purge valve 24, pressure relief valves 27 and 28, extract valves 29 and 30, and control valve 17 are maintained closed.

Figure 12:
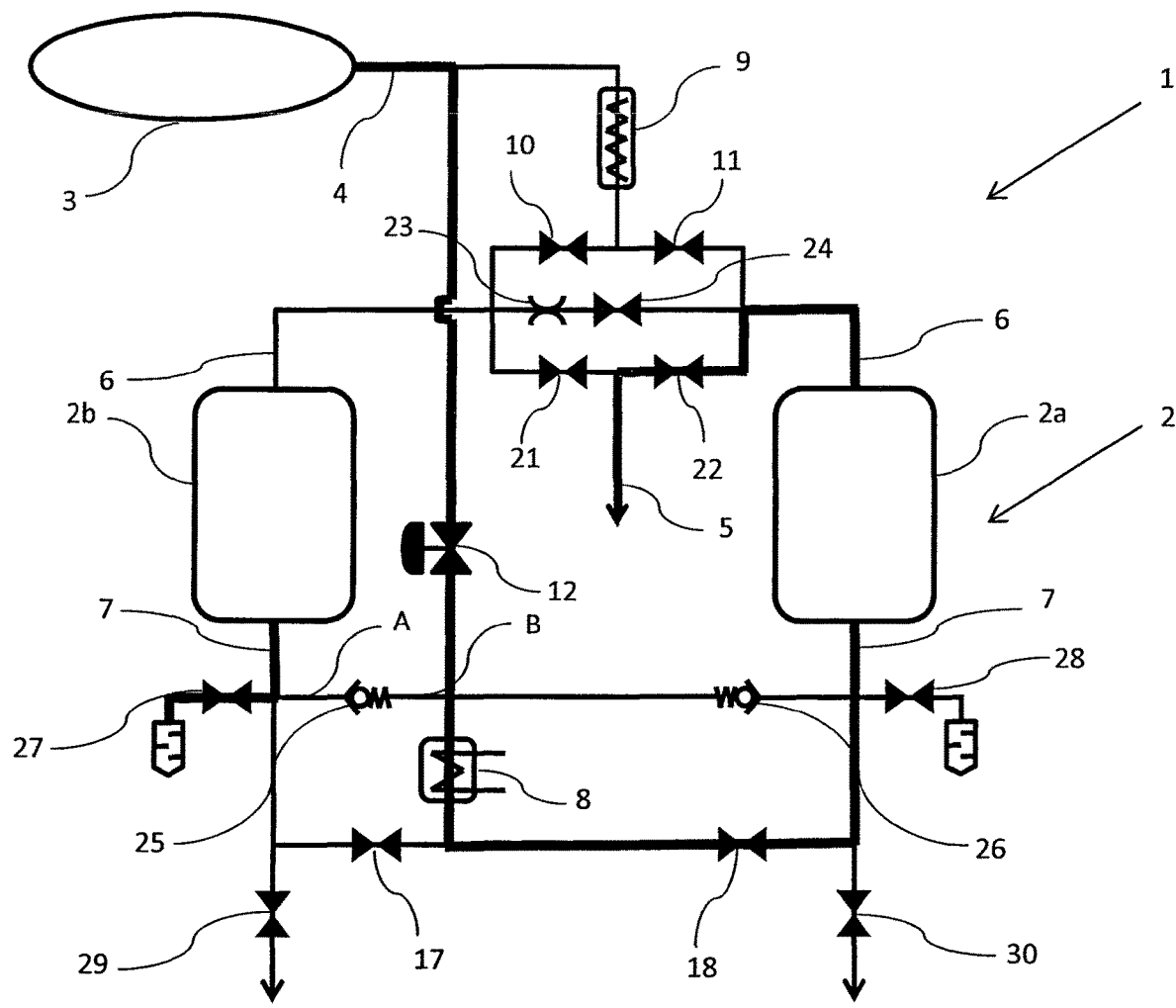

Because the pressure level at the level of conduit A is higher than the pressure level at the level of conduit B, the one way valve 25 opens and allows the gas flow to reach the cooler 8. The gas flowing through the regulating valve 12 also reaches the cooler 8 and it is cooled before reaching the adsorption vessel 2a. After the first regeneration cycle ends, adsorption vessel 2b can be subjected to a pressure relief state, as illustrated in FIG. 12. At the same time, adsorption vessel 2a is preferably maintained in the adsorption cycle.

The gas flowing through the dryer inlet 4 is cooled down by cooler 8, is guided through adsorption vessel 2a and further through the dryer outlet 5 to the external network.

Preferably, regulating valve 12 is open, as well as control valve 18 and outlet valve 22. Inlet valves 10 and 11, purge valve 24, outlet valve 21, control valve 17, extract valves 29 and 30 and pressure relief valve 28 are maintained closed.

Preferably, in such a working state pressure relief valve 27 is maintained open such that the pressure build within the adsorption vessel 2b can be evacuated.

Because the pressure level at conduit A is smaller than the pressure level at conduit B, one way valve 25 is not opening.

Figure 13:
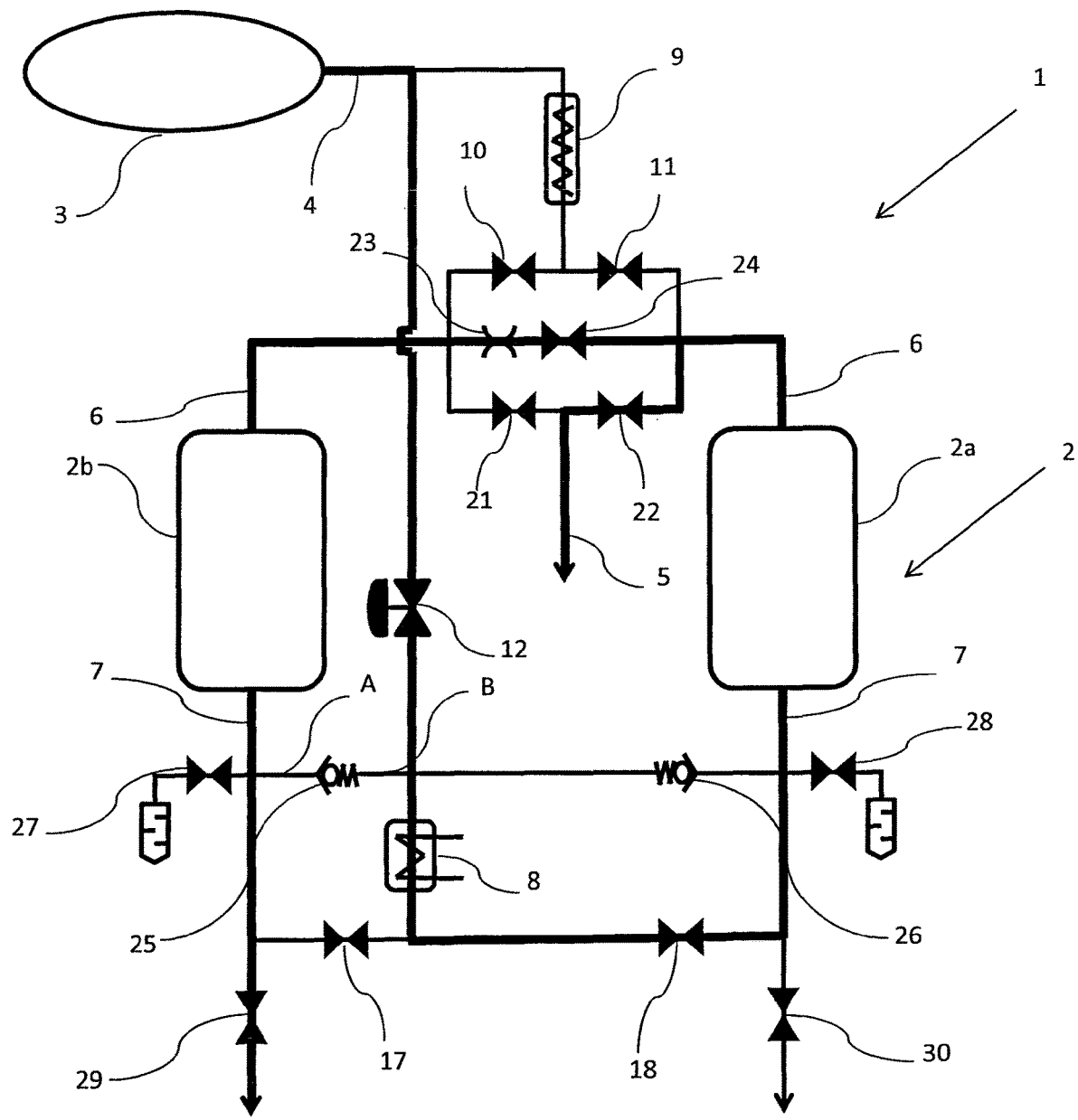

Preferably, in a subsequent step the adsorption vessel 2b is cooled by means of a purge gas flow and the adsorption vessel 2a is maintained in adsorption state, as illustrated in FIG. 13.

In such a working state, the gas flowing through the dryer inlet 4 reaches the cooler 8, the cooled gas is then guided through the adsorption vessel 2a and part of the gas flow will reach the external network through the dryer outlet 5 and part of it will flow through the nozzle 23, will reach adsorption vessel 2b which will be cooled and will be further evacuated to the atmosphere or the outside environment.

Accordingly, regulating valve 12, control valve 18, outlet valve 22, purge valve 24 and extract valve 29 are open and inlet valves 10 and 11, outlet valve 21, pressure relief valves 27 and 28, control valve 17 and extract valve 30 are closed.

Preferably, said nozzle 23 allows only a limited volume of the gas flow to pass therethrough and reach the adsorption vessel 2b. Depending on the type of nozzle used, such a nozzle can allow between 5 and 20% of the gas flow to pass therethrough. As an example, but not limiting to, the nozzle used by the adsorption dryer 1 allows approximately 10% of the gas flow to pass therethrough.

Since the pressure level at the level of conduit A is smaller than the pressure level at the level of conduit B, one way valve 25 does not open.

Figure 14:
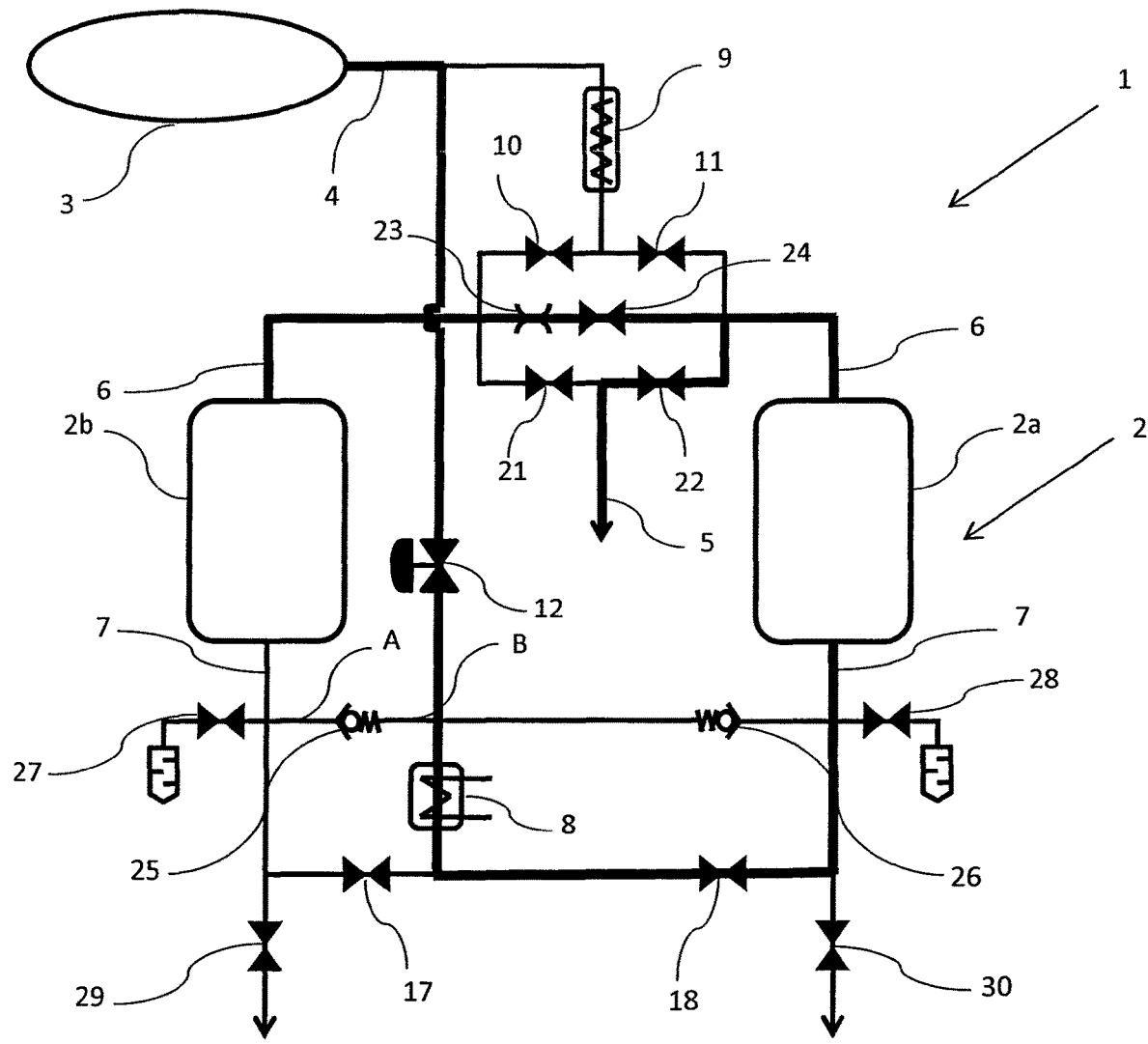

The control system can further bring the adsorption vessel 2b in a pressure equalization state while the adsorption vessel 2a is maintained in an adsorption state, as illustrated in FIG. 14.

Preferably, the gas flowing through the dryer inlet 4 reaches the cooler 8, the cooled gas is guided through the adsorption vessel 2a and part of the gas flow reaches the external network through the dryer outlet 5 and part of said gas flow enters in the adsorption vessel 2b.

Preferably, pressure relief valve 27, control valve 17 and extract valve 29 are closed such that the pressure within the adsorption vessel 2b reaches the desired value.

Regulating valve 12, control valve 18, outlet valve 22 and purge valve 24 are open and inlet valves 10 and 11 and outlet valve 21 are maintained closed.

Figure 15:
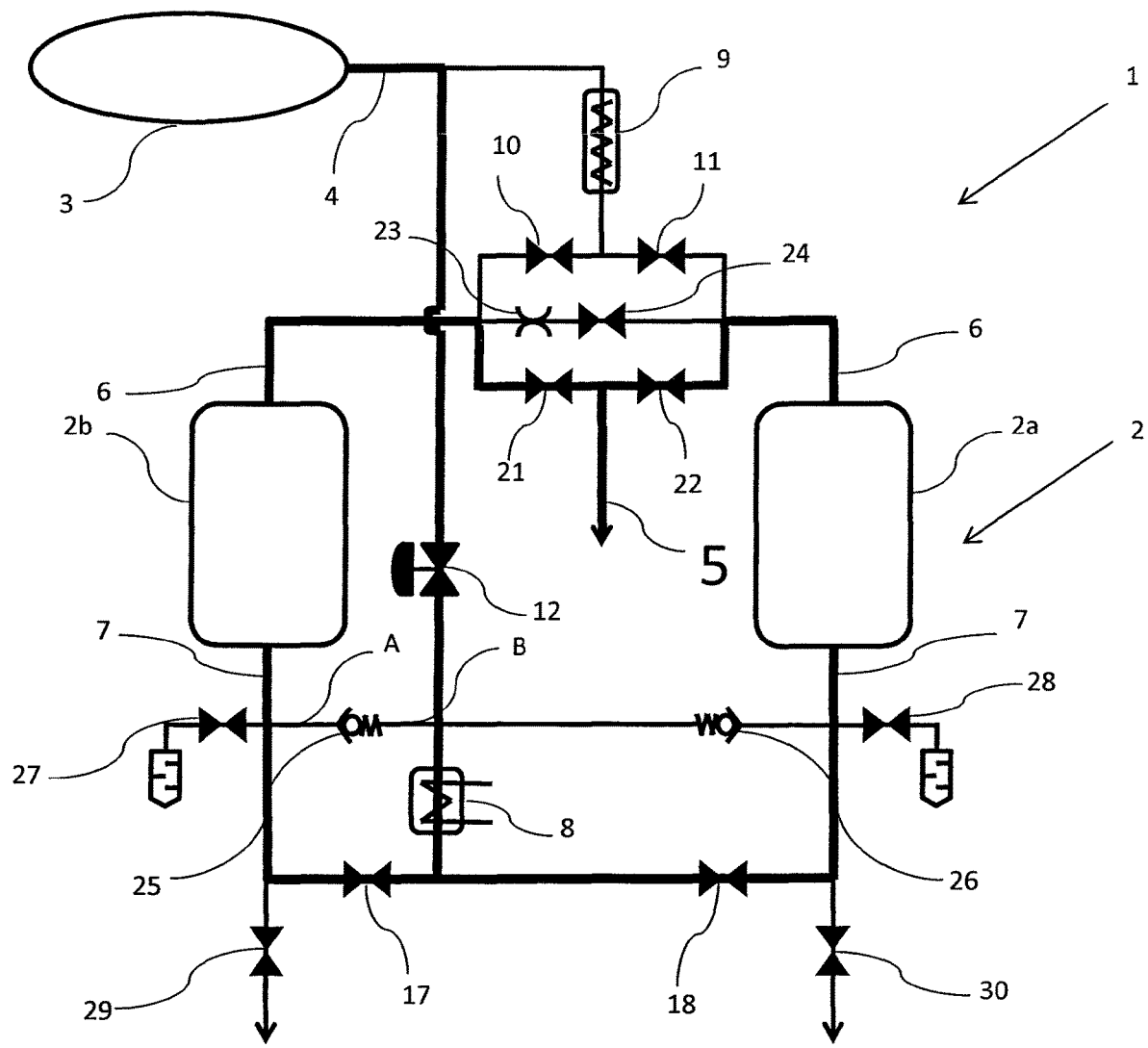

After adsorption vessel 2b has been pressurized, the controller can further subject the adsorption vessels 2a and 2b to a split flow state, as illustrated in FIG. 15.

The gas flowing through the dryer inlet 4 and coming from the compressor 3 reaches the cooler 8, the cooled gas is then split and reaches both adsorption vessels 2a and 2b before reaching the external network through dryer outlet 5.

The regulating valve 12, control valves 17 and 18 and outlet valves 21 and 22 are open and inlet valves 10 and 11, purge valve 24, pressure relief valves 27 and 28, and extract valves 29 and 30 are maintained closed.

It should be understood that such a working state is optional. The benefit of a split flow state is a low pressure drop between the pressure at the level of the dryer inlet 4 and the pressure level at the level of the dryer outlet 5.

Figure 16:
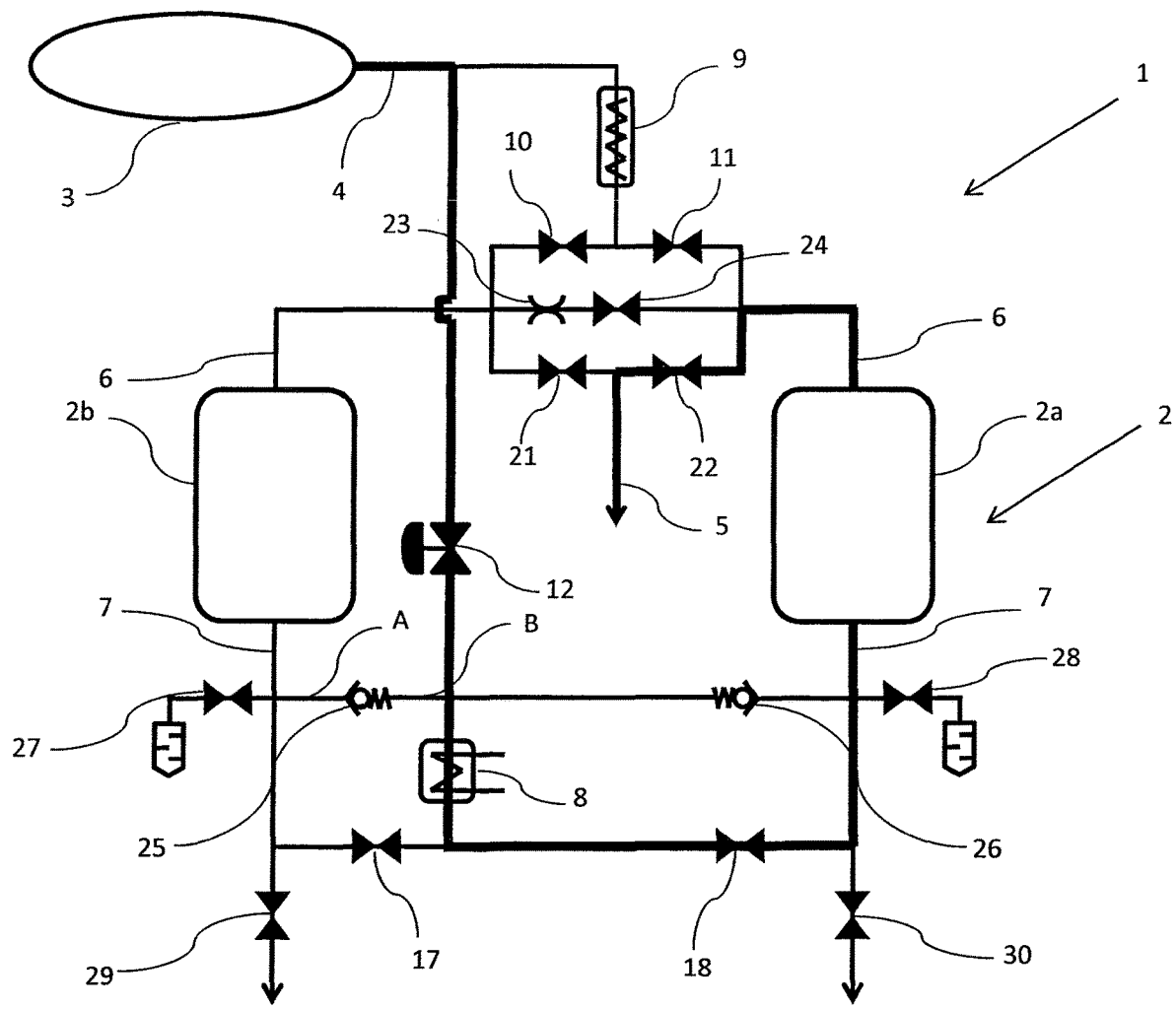

Subsequently, adsorption vessel 2b can be brought into a standby state while adsorption vessel 2a can be maintained in adsorption state, as illustrated in FIG. 16.

During such a working state, the gas flowing through the dryer inlet 4 reaches the cooler 8, the cooled gas is guided through adsorption vessel 2a and further reaches the external network through dryer outlet 5.

Accordingly, regulating valve 12, control valve 18 and outlet valve 22 are open and inlet valves 10 and 11, purge valve 24, outlet valve 21, pressure relief valves 27 and 28, extract valves 29 and 30 and control valve 17 are maintained closed.

Subsequently, the working stages described above with respect to FIGS. 10 to 16 will be applied to the adsorption vessels 2a and 2b in such a way that the adsorption vessels will be shifted between each other such that adsorption vessel 2b will be subjected to an adsorption stage and adsorption vessel 2a will be regenerated. Accordingly, the working principle as described above with respect to FIGS. 10 to 16 will remain the same.

Figure 17:
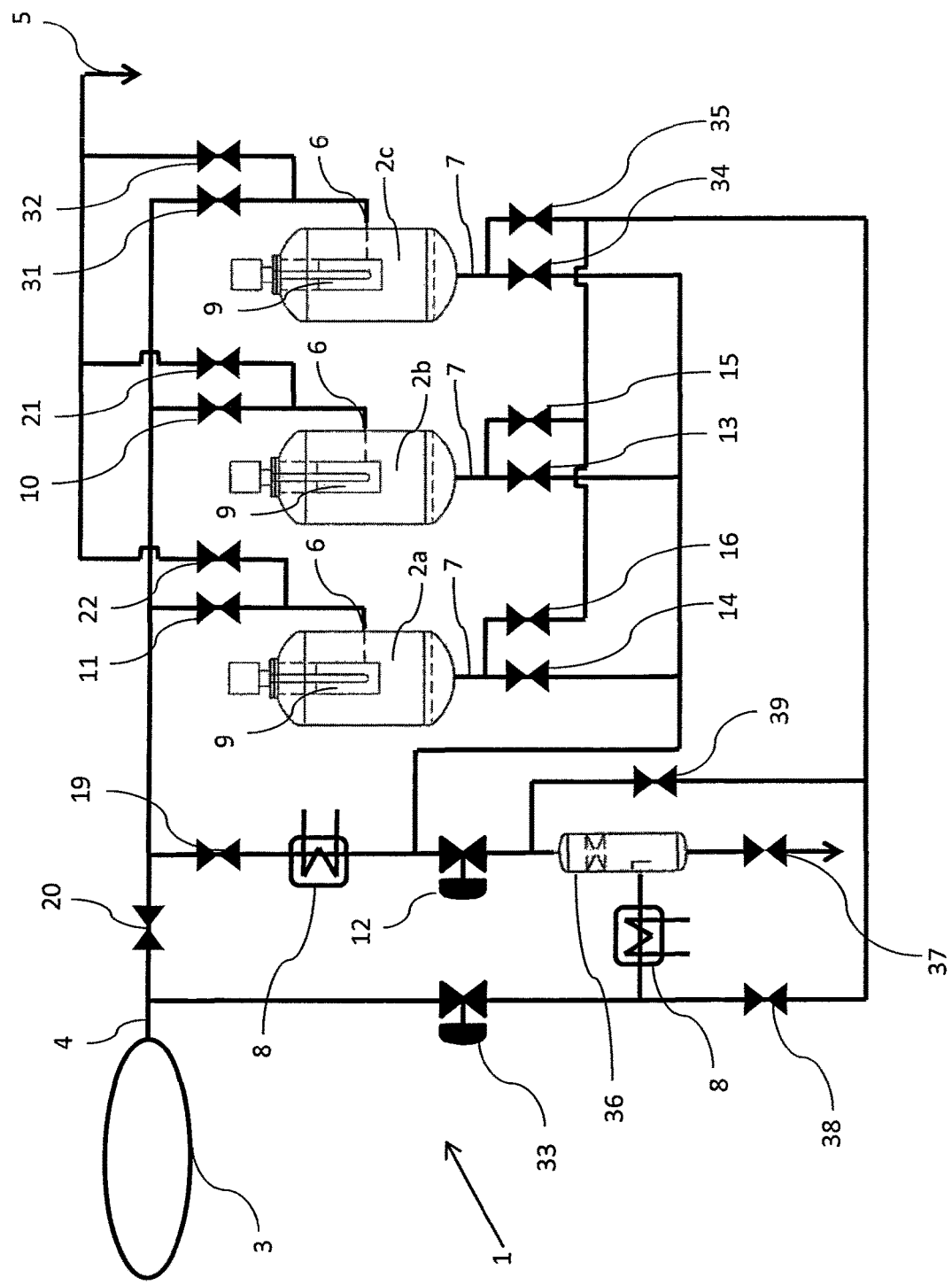

FIG. 17 illustrates the case in which adsorption dryer 1 comprises 3 adsorption vessels 2a, 2b and 2c. Preferably, but not limiting to, each adsorption vessel 2a, 2b and 2c comprises an internal heater 9.

The adsorption dryer 1 preferably further comprises an additional regulating valve 33 for controlling the volume of gas reaching at least one of the adsorption vessels 2a, 2b and 2c based on the temperature measured within said at least one adsorption vessel 2a, 2b and 2c.

Additionally, a water separator 36 can be used for eliminating excess water from the system. Said water separator 36 being provided with at least one extract valve 37 for eliminating the collected water. The adsorption dryer 1 further comprises cut-off valves 38 and 38 for controlling the flow of gas.

As in the above presented examples, the control valve 19 and the cut-off valve 20 are maintained, as well as the layout of the inlet valves, outlet valves, two way valves and control valves for each adsorption vessel. Additionally, inlet valve 31, outlet valve 32, a two way valve 34 and a control valve 35 have been added for the third adsorption vessel 2c.

Figure 18:
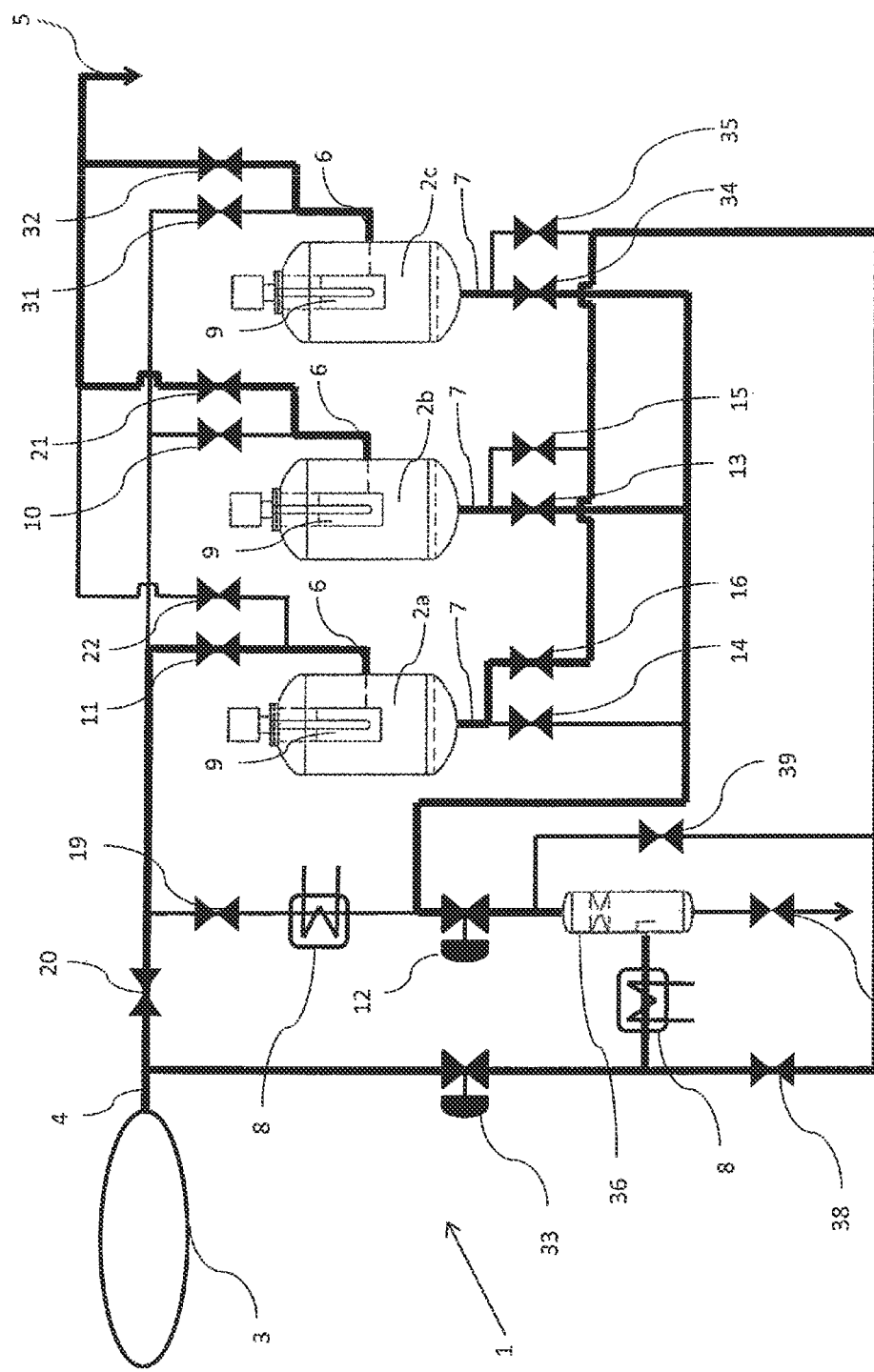

FIG. 18 illustrates the flow within the adsorption dryer 1 when adsorption vessel 2a is subjected to a second regeneration cycle and adsorption vessels 2b and 2c are subjected to an adsorption cycle. Preferably, the gas flowing through the dryer inlet 4 is at a relatively high temperature because is preferably being previously compressed by compressor 3.

Preferably, regulating valve 33 is partially open such that approximately 50% of the volume of gas flowing through the dryer inlet 4 is allowed to flow therethrough and the rest of the volume of gas reaches adsorption vessel 2a.

The gas flowing through the outlet 7 of adsorption vessel 2a recombines with the volume of gas flowing through the regulating valve 33 and reaches the cooler 8. The cooled gas is guided through the water separator before being split between adsorption vessels 2b and 2c.

The relatively cold and dry gas leaving the two adsorption vessels 2b and 2c is guided through the dryer outlet 5 towards the external network.

Accordingly, cut-off valve 20, regulating valve 33, inlet valve 11, control valve 16, cut-off valve 38, two way valves 13 and 34, and outlet valves 21 and 32 are maintained open and control valve 19, extract valve 37, cut-off valve 39, outlet valve 22, inlet valves 10 and 31, two way lave 14, and control valves 15 and 35 are maintained closed.

Subsequently, the adsorption vessel 2a can be subjected to a first regeneration cycle while the adsorption vessels 2b and 2c are maintained in an adsorption cycle.

Preferably, the internal heater 9 of the adsorption vessel 2a is switched on, increasing even more the temperature of the volume of gas reaching said adsorption vessel 2a.

The path of the gas flow remains the same as in the previous example, the only difference being the degree of openness of regulating valve 33 which, in this case is preferably open approximately 80%, such that the volume of gas reaching the adsorption vessel 2a is approximately 20% and, accordingly, the efficiency of the internal heater 9 is increased.

Figure 19:
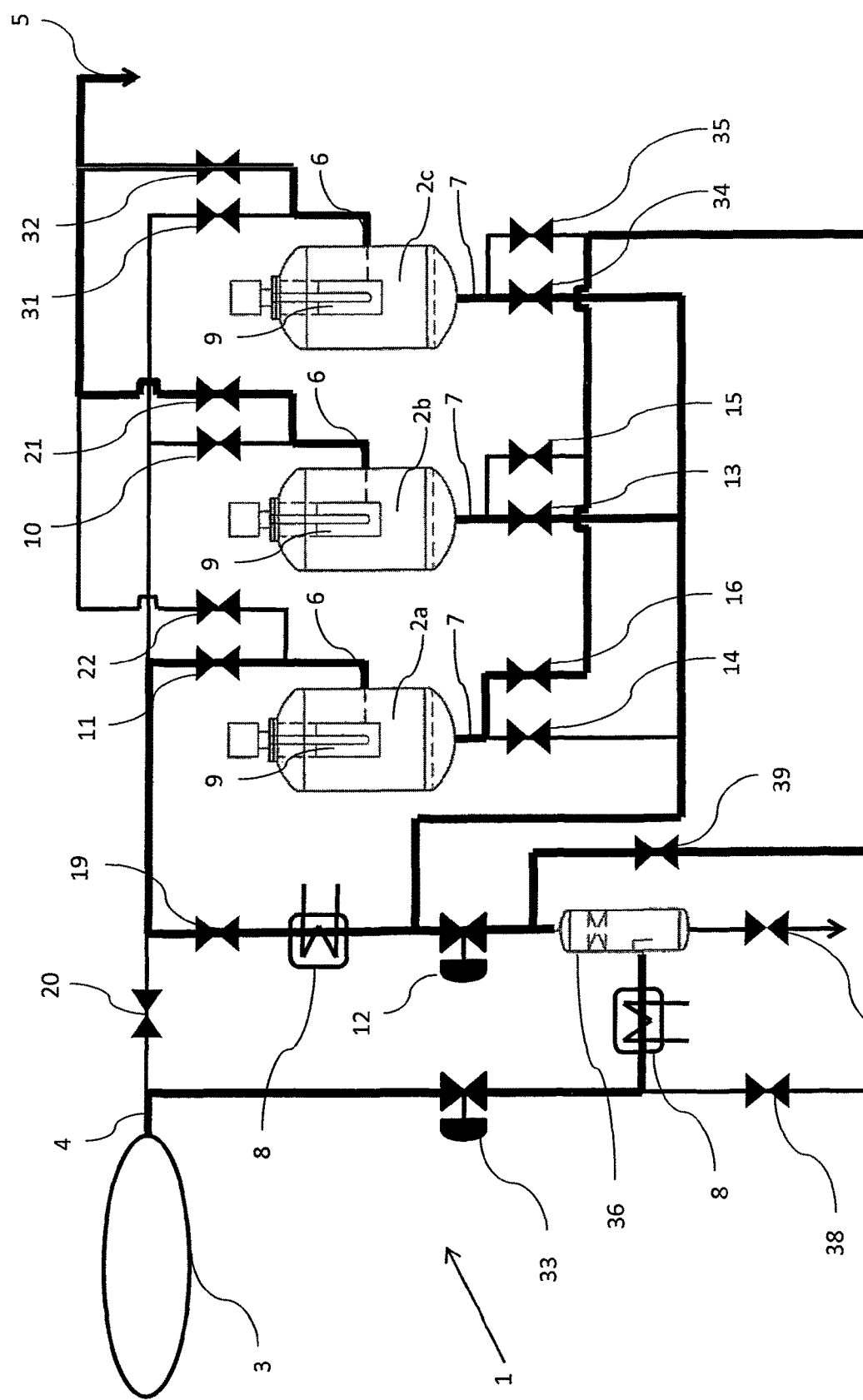

In a subsequent step, as illustrated in FIG. 19, the adsorption vessel 2a can be subjected to a cooling cycle, while adsorption vessels 2b and 2c are maintained in an adsorption cycle.

Preferably, regulating valve 33 is fully open and regulating valve 12 is partially open. The degree of openness of regulating valve 12 can be for example approximately 80%.

The gas flowing through the dryer inlet 4 is preferably cooled by cooler 8, passes through the water separator 36, and because of the degree of openness of regulating valve 12, approximately 20% of the gas flow reaches the adsorption vessel 2a, cooling it. The gas flowing through the inlet 6 of the adsorption vessel 2a is guided through the cooler 8 and recombines with the gas flowing through the regulating valve 12. Further the resulting gas flow reaches adsorption vessels 2b and 2c and moisture is adsorbed.

The relatively cold and dry gas is guided through the dryer outlet 5 towards the external network.

Subsequently, the working stages described above with respect to FIGS. 18 and 19 will be applied to the adsorption vessels 2a, 2b and 2c in such a way that the adsorption vessel subjected to a first and/or a second regeneration cycle will be shifted. For example, adsorption vessel 2b will be regenerated while adsorption vessels 2a and 2c will be maintained in a regeneration cycle. The working principle as described above with respect to FIGS. 18 and 19 will remain the same. Subsequently, adsorption vessel 2c will be regenerated while adsorption vessels 2a and 2b will be maintained in a regeneration cycle.

Figure 20:
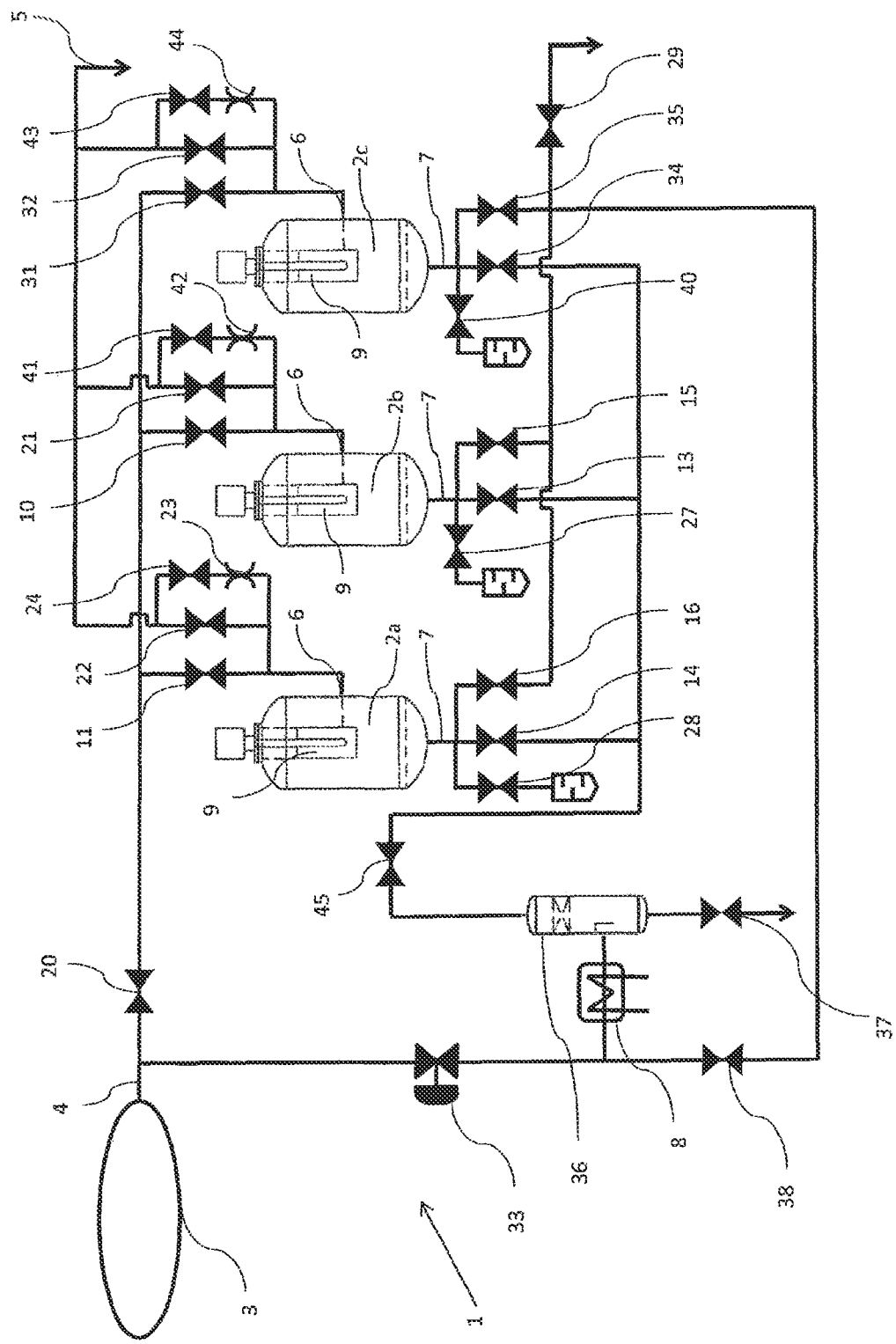

FIG. 20 illustrates a layout of the adsorption dryer 1 comprising 3 adsorption vessels 2a, 2b and 2c in which a volume of purge gas is used for cooling down each of the three adsorption vessels 2a, 2b and 2c.

The layout of said adsorption dryer 1 is similar to the one disclosed in FIG. 17, one of the differences being that each of the adsorption vessels 2a, 2b, 2c further comprises a nozzle 23, 42 and 44 and a purge valve 24, 41 and 43 for controlling the flow of gas through said nozzle 23, 42 and 44.

Each adsorption vessel 2a, 2b and 2c further comprises a pressure relief valve 28, 27 and 40 allowing the pressure built within said adsorption vessel 2a, 2b and 2c to be relieved into the atmosphere or the outside environment.

In this case control valve 19, cooler 8 (which was positioned on the same conduit as control valve 19, in FIG. 17), regulating valve 12 and cut-off valve 39 are removed and cut-off valve 45 and extract valve 29 have been added.

Figure 21:
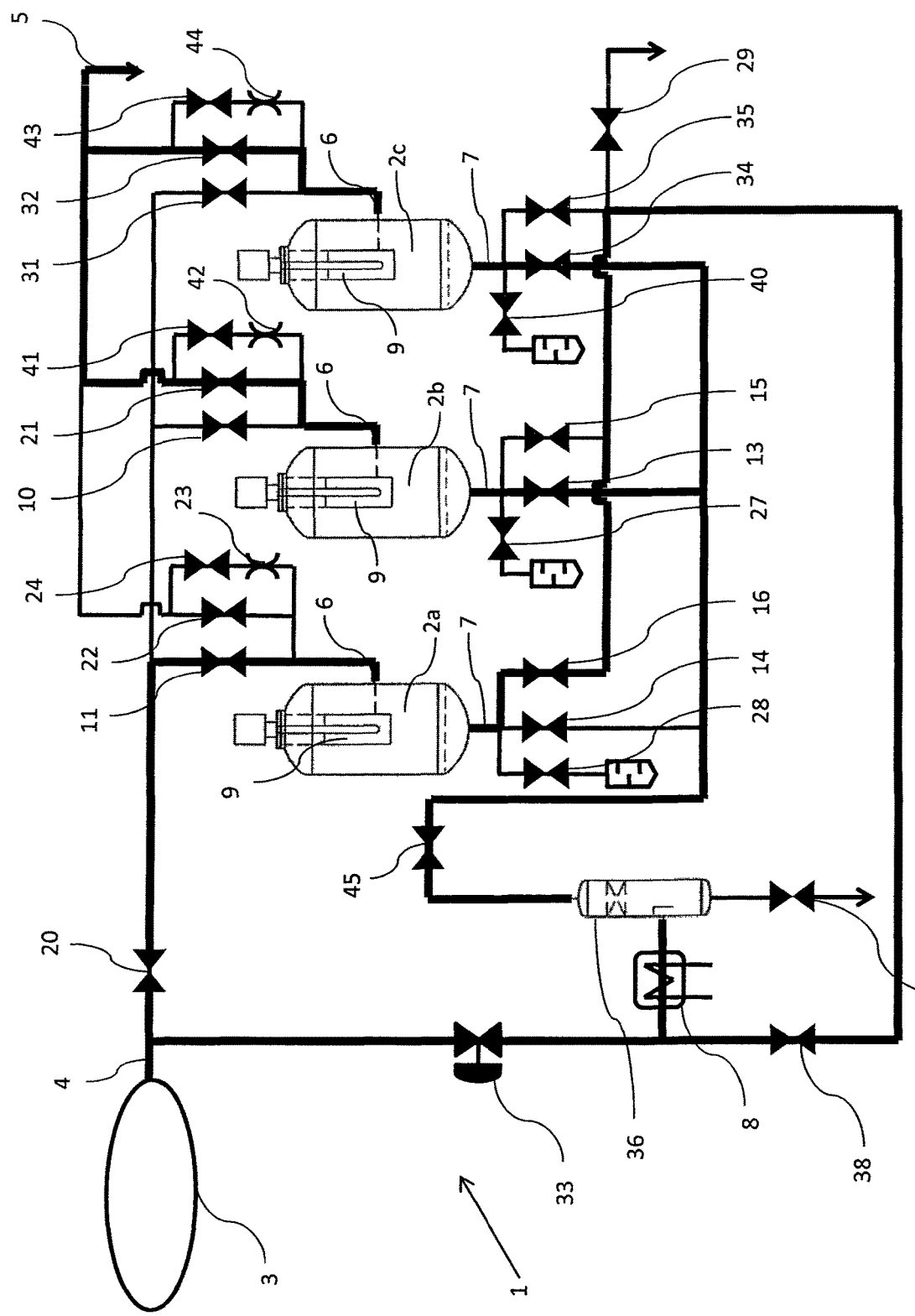

FIG. 21 illustrates the case in which adsorption vessel 2a is subjected to a second regeneration cycle and adsorption vessels 2b and 2c are subjected to an adsorption cycle.

The gas flow through the adsorption dryer 1 is the same as the one described in correlation with FIG. 18.

Preferably, the regulating valve 33 is partially open, such that approximately 50% of the gas flowing through the dryer inlet 4 is allowed to reach adsorption vessel 2a and the rest approximately 50% of the gas flow is flowing through said regulating valve 33.

Subsequently, the adsorption vessel 2a can be subjected to a first regeneration cycle, in which case, internal heater 9 of said adsorption vessel 2a is switched on and adsorption vessels 2b and 2c are maintained in a adsorption cycle.

The gas flow remains the same as in the case of FIG. 21, and regulating valve 33 is preferably partially open, such that approximately 20% of the gas flowing through the dryer inlet 4 reaches the adsorption vessel 2a wherein its temperature is further increased.

Figure 22:
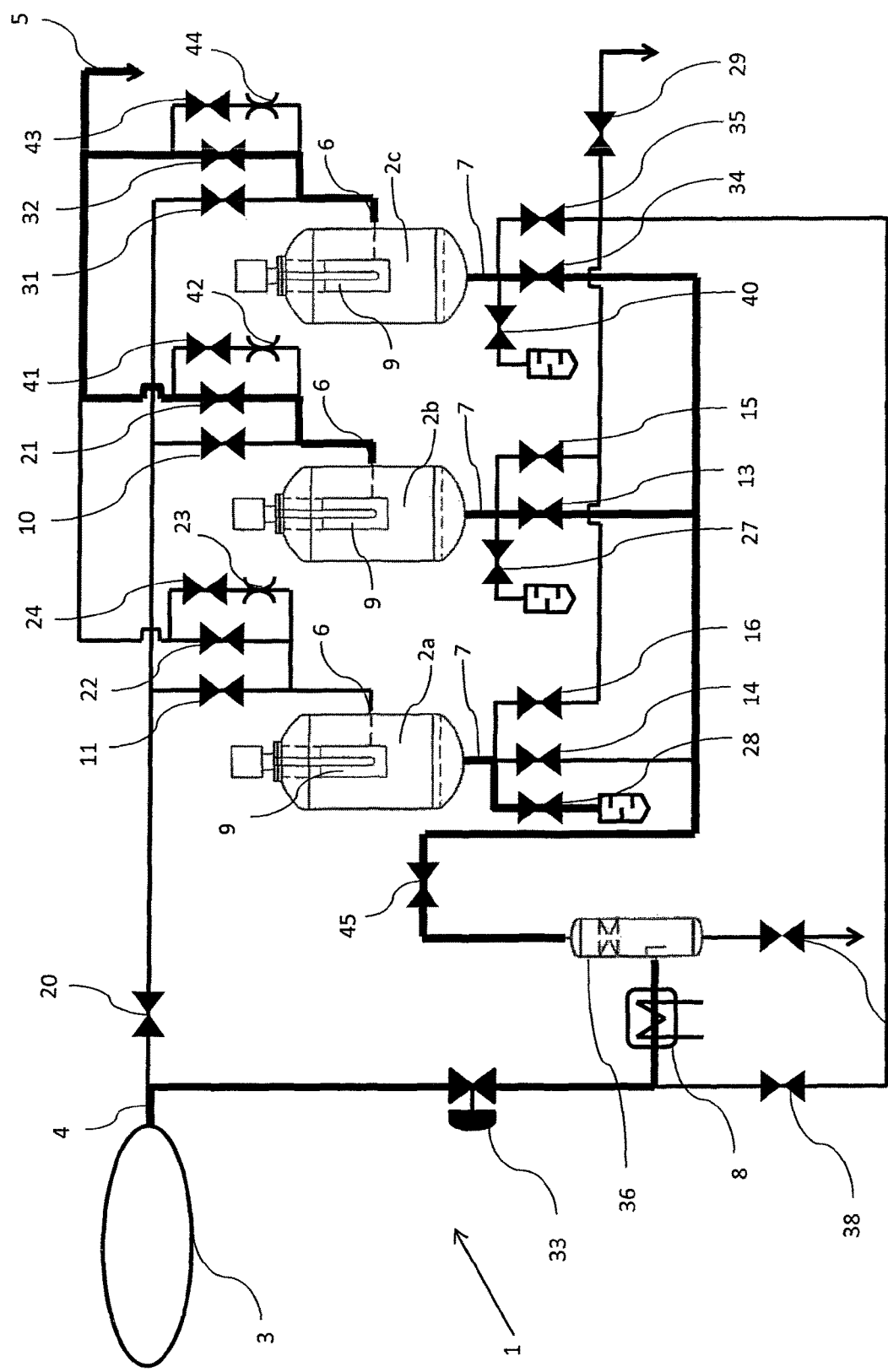

Subsequently, adsorption vessel 2a can be subjected to a depressurization cycle, while adsorption vessels 2b and 2c are maintained in an adsorption cycle, as illustrated in FIG. 22.

In such a situation, the gas flowing through the dryer inlet 4 is cooled by cooler 8, is further guided through the water separator 36 and towards the adsorption vessels 2b and 2c before being directed to the external network through the dryer outlet 5.

Preferably, the pressure relief valve 28 is opened such that pressure previously built within adsorption vessel 2a is relieved within the atmosphere or the outside environment.

Accordingly, regulating valve 33, cut-off valve 45, two way valves 13 and 34, outlet valves 21 and 32, and pressure relief valve 28 are open and cut-off valve 20, cut-off valve 38, extract valve 37, two way valve 14, control valves 15, 16, and 35, pressure relief valves 27 and 40, extract valve 29, inlet valves 10, 11 and 31, outlet valve 22, purge valves 24, 41 and 43 are maintained closed.

Figure 23:
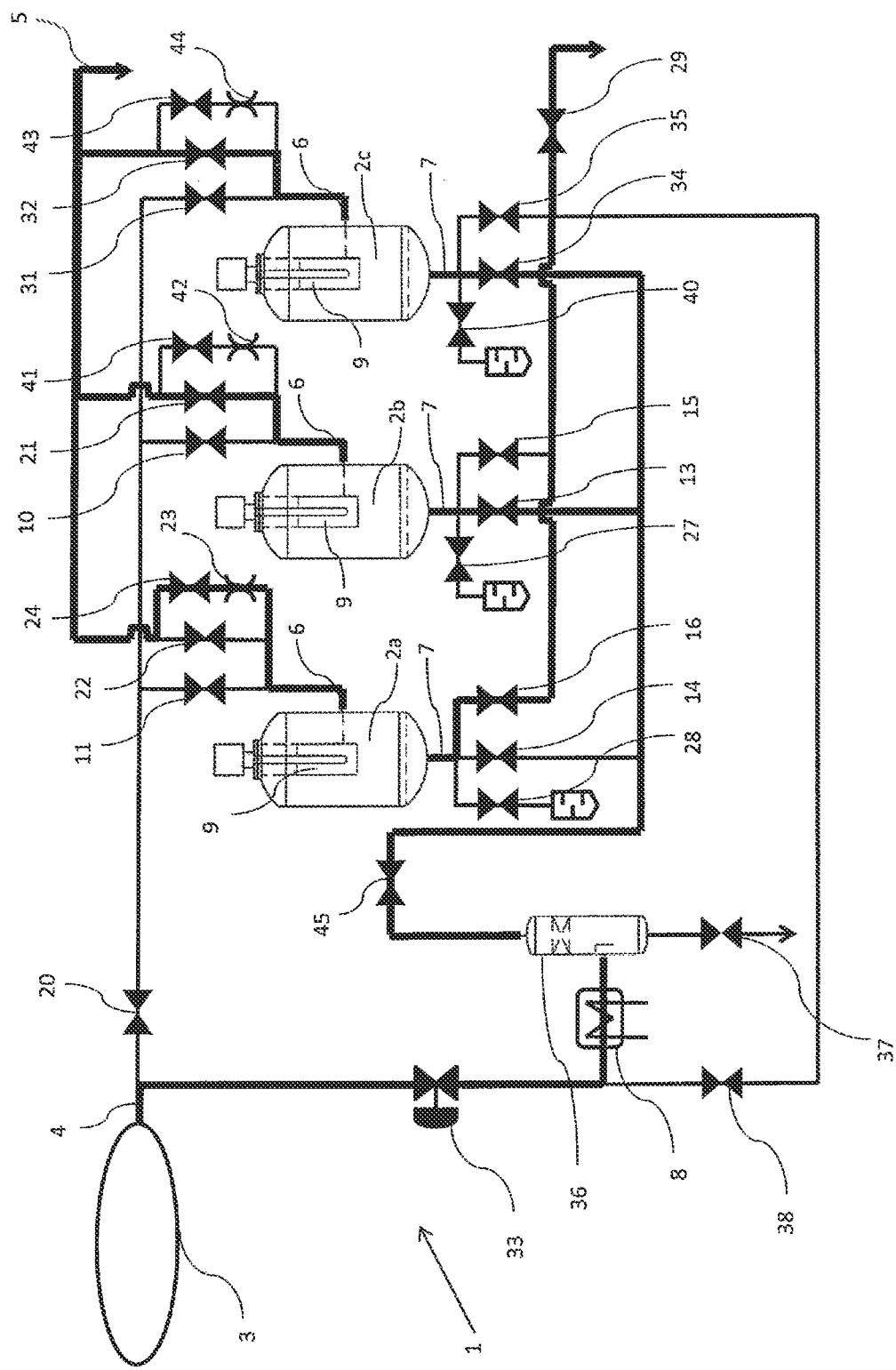

Subsequently, adsorption vessel 2a can be further subjected to a cooling cycle by using a purge gas, while adsorption vessels 2b and 2c are maintained in an adsorption cycle, as illustrated in FIG. 23.

Preferably, the gas flowing through the dryer inlet 4 is cooled by the cooler 8, flows through the water separator 36 and reaches the adsorption vessels 2b and 2c. Further, part of the gas flow reaches the external network through the dryer outlet 5 and a small part of said gas flow is guided through the nozzle 23, into the adsorption vessel 2a, cooling it.

The gas flowing through the outlet 7 of the adsorption vessel 2a, which is relatively dry gas at a relatively high temperature is guided to the atmosphere or the outside environment.

Accordingly, regulating valve 33, cut-off valve 45, two way valves 13 and 34, outlet valves 21 and 32, purge valve 24, control valve 16 and extract valve 29 are open and cut-off valves 20 and 38, extract valve 37, two way valve 14, pressure relief valves 27, 28 and 40, control valves 15 and 35, inlet valves 10, 11 and 31, outlet valve 22, purge valves 41 and 43 are maintained closed.

Subsequently, the working stages described above with respect to FIGS. 21 to 23 will be applied to the adsorption vessels 2a, 2b and 2c in such a way that the adsorption vessel subjected to a first and/or a second regeneration cycle will be shifted. For example, adsorption vessel 2b will be regenerated while adsorption vessels 2a and 2c will be maintained in a regeneration cycle. The working principle as described above with respect to FIGS. 21 to 23 will remain the same. Subsequently, adsorption vessel 2c will be regenerated while adsorption vessels 2a and 2b will be maintained in a regeneration cycle.

In the above presented examples it should be understood that, when going from one working state to another, the control system can either change the state of all valves (open or close) at the same time or can perform such an operation such that the state of only one valve is changed at a specific moment in time.

It should be further understood that all the described examples can comprise a water separator 36 positioned as in FIGS. 17 to 23 or in a different location, each having at least one extract valve 37, even though such a water separator is not explicitly included in the respective drawings. Said at least one extract valve 37 being periodically open such that water collected by said water separator 36 is eliminated from the adsorption dryer 1.

It should be further understood that the control system follows the above presented sequence partially or completely, or can follow another sequence having another order for the working states of the adsorption dryer 1.

Moreover, with respect to the examples presented above in correlation with FIGS. 9 to 23, it should be understood that the method for regulating the regeneration time of an adsorption dryer and one or more of the respective time intervals as defined in the present document are being calculated and implemented according to the present invention.

The present invention is by no means limited to the embodiments described as an example and shown in the drawings, but such an adsorption dryer 1 can be realized in all kinds of variants, without departing from the scope of the invention.

The invention claimed is:

1. A method for regulating the regeneration time of an adsorption dryer, the method comprising the steps of:
    subjecting the adsorption dryer to an adsorption cycle wherein a process gas is directed through a dryer inlet and moisture is adsorbed from the process gas;
    stopping the adsorption cycle after a preset adsorption time interval; and subsequently
    subjecting the adsorption dryer to a first regeneration cycle during a preset minimum heat regeneration time interval by heating a regeneration gas prior to directing it through the dryer inlet;
wherein:
    the pressure dew point or the relative humidity within said adsorption dryer is measured after a second preset adsorption time interval, and, if said measured pressure dew point or relative humidity is higher than a predetermined pressure dew point or relative humidity threshold, maintaining the first regeneration cycle for an additional regeneration time interval; and/or
    the outlet temperature, of the regeneration gas at a dryer outlet is measured, and, if the outlet temperature is higher than or equal to a predetermined temperature threshold, and, if the time frame in which the adsorption dryer is subjected to said first regeneration cycle is greater than a minimum heat regeneration time interval, then the method comprises the step of stopping said first regeneration cycle.

2. The method according to claim 1, wherein if said measured outlet temperature is lower than said predetermined temperature threshold and if the time frame in which said adsorption dryer is subjected to said first regeneration cycle is larger than or equal to a maximum heat regeneration time interval, said first regeneration cycle is stopped.

3. The method according to claim 1, wherein the additional regeneration time interval, is calculated by adding a first predetermined time interval, to a previously set additional regeneration time interval.

4. The method according to claim 1, wherein if the measured pressure dew point or relative humidity is lower than a second pressure dew point or relative humidity threshold, maintaining the regeneration cycle for a second additional regeneration time interval, wherein said second predetermined pressure dew point or relative humidity threshold is lower than the first predetermined pressure dew point or relative humidity threshold.

5. The method according to claim 4, further comprising the step of recalculating said predetermined minimum heat regeneration time interval, by adding said additional regeneration time interval, to a predetermined minimum time interval, or by adding said second additional regeneration time interval, to said predetermined minimum heat regeneration time interval.

6. The method according to claim 4, further comprising the step of calculating a maximum heat regeneration time interval in which the regeneration cycle can be maintained, by adding said additional regeneration time interval, to a preset maximum heat regeneration time interval; or by adding said second additional regeneration time interval, to said preset maximum heat regeneration time interval.

7. The method according to claim 1, wherein the adsorption dryer is subjected to a second regeneration cycle, by maintaining the flow of process gas through the dryer inlet, for a preset minimum regeneration time interval.

8. The method according to claim 4, wherein the method further comprises the step of recalculating a minimum regeneration time interval in which the flow of process gas is maintained at the dryer inlet, by subtracting said additional regeneration time interval, from said preset minimum regeneration time interval, or by subtracting said second additional regeneration time interval, from said preset minimum regeneration time interval or
wherein the method further comprises the step of calculating a maximum regeneration time interval, in which the flow of process gas is maintained at the dryer inlet, by subtracting said additional regeneration time interval, from a predetermined maximum time interval, or by subtracting said second additional regeneration time interval, from said preset maximum regeneration time interval.

9. The method according to claim 7, wherein the adsorption dryer is first subjected to the second regeneration cycle and then to the first regeneration cycle.

10. The method according to claim 7, wherein the adsorption dryer is provided with at least two adsorption vessels and in that the first regeneration cycle and the second regeneration cycle are applied to each adsorption vessel alternatively.

11. An adsorption dryer comprising:
at least one adsorption vessel comprising adsorption means, an inlet and an outlet for allowing a gas to flow therethrough;
a controller unit;
a source of said gas, connectable to the inlet of said at least one adsorption vessel through a dryer inlet, said gas being a process and/or a regeneration gas;
a heater positioned on said dryer inlet and configured to heat a regeneration gas flowing therethrough when the adsorption vessel is maintained in a first regeneration cycle; wherein:
said controller unit further comprises means to measure a pressure dew point or a relative humidity within said at least one adsorption vessel after a second preset adsorption time interval, to receive said measured data, and to maintain the flow of the regeneration gas through said inlet for an additional regeneration time interval, if said measured pressure dew point or relative humidity is higher than a first predetermined threshold; and/or
said controller unit further comprises a temperature sensor positioned at the outlet of said at least one adsorption vessel and is further configured to stop the first regeneration cycle after a minimum heat regeneration time interval, if the measured outlet temperature is higher than or equal to a predetermined threshold,
further comprising a cooler positioned at the outlet of the at least one adsorption vessel and being configured to cool the gas flowing through said outlet.

12. The adsorption dryer according to claim 11, wherein it comprises at least two adsorption vessels.

13. The adsorption dryer according to claim 12, wherein each of the at least two adsorption vessels comprises a cooler positioned at the outlet of each of said adsorption vessels.

14. The adsorption dryer according to claim 12, wherein the controller unit further comprises means to alternatively maintain each of the at least two adsorption vessels in: a second regeneration cycle wherein said heater is switched off; subsequently in the first regeneration cycle wherein said heater is switched on; subsequently in a cooling cycle wherein the gas is cooled by means of a cooler; and subsequently in a standby cycle wherein the flow of gas through said adsorption vessel is stopped.

15. The adsorption dryer according to claim 14, wherein the controller unit is further configured to regulate the time interval in which each of the adsorption vessels is maintained in said first regeneration cycle, second regeneration cycle, cooling cycle and standby cycle based on the measured temperature and either the pressure dew point or relative humidity.

16. The adsorption dryer according to claim 11, wherein when said at least one adsorption vessel is maintained in a cooling cycle, the controller unit is configured to actuate a two way valve for allowing the flow of gas coming from said source to be cooled by the cooler and flow through the adsorption vessel.

17. A controller unit regulating the time in which an adsorption dryer is maintained in a regeneration cycle, said controller unit comprising:
a timer, for determining the time interval in which an adsorption vessel of said adsorption dryer is maintained in a regeneration cycle, said adsorption vessel comprising an inlet and an outlet for allowing a flow of gas therethrough;
wherein said controller unit:
further comprises: a user interface for receiving a requested pressure dew point or relative humidity, a dew point pressure sensor or a relative humidity determinant positioned within the adsorption vessel of said adsorption dryer,
being further configured to maintain the adsorption dryer in a first regeneration cycle for an additional regeneration time interval, if the measured pressure dew point or the relative humidity is higher than said requested pressure dew point or relative humidity; and/or
further comprises a temperature sensor positioned at the outlet of said adsorption vessel and is further configured to stop the first regeneration cycle if the measured outlet temperature is greater than or equal to a predetermined temperature threshold, and, if said time interval in which the adsorption dryer is maintained in said regeneration cycle is greater than a minimum heat regeneration time interval.

18. The controller unit according to claim 17, further comprising a processing unit configured to recalculate said additional regeneration time interval by adding a first predetermined time interval, to a previously set additional regeneration time interval.

19. The controller unit according to claim 17, wherein the controller unit further comprises means for maintaining the regeneration cycle for a second additional regeneration time interval, if the measured pressure dew point or relative humidity is lower than the requested pressure dew point or relative humidity.

20. The controller unit according to claim 19, further comprising calculating means configured to calculate said second additional regeneration time interval, by adding a second predetermined time interval, to a previously set time interval.

21. The controller unit according to claim 20, wherein said calculation means are configured to further calculate:
- a minimum heat regeneration time interval, by adding said additional regeneration time interval, to a preset minimum heat regeneration time interval; or by adding said second additional regeneration time interval, to said preset minimum heat regeneration time interval; and/or
- a maximum heat regeneration time interval in which the first regeneration cycle can be maintained, by adding said additional regeneration time interval, to a preset maximum heat regeneration time interval; or by adding said second additional regeneration time interval, to said preset maximum heat regeneration time interval; and/or
- minimum regeneration time interval in which the flow of gas from the outlet of the compressor unit is maintained at the dryer inlet, by subtracting said additional regeneration time interval, from said preset minimum regeneration time interval, or by subtracting said second additional regeneration time interval, from said preset minimum regeneration time interval; and/or
- a maximum regeneration time interval in which the flow of gas from the outlet of a compressor unit is maintained at the dryer inlet, by subtracting said additional regeneration time interval, from a preset maximum regeneration time interval, or by subtracting said second additional regeneration time interval, from said preset maximum regeneration time interval.

22. The controller unit according to claim 21, wherein the controller unit comprises means for maintaining said adsorption vessel in a first regeneration cycle for the calculated additional regeneration time interval, if said calculated additional regeneration time interval, or second additional regeneration time interval, is comprised within the interval delimited by the minimum heat regeneration time interval and the maximum heat regeneration time interval, and/or stopping said first regenerating cycle after said maximum heat regeneration time interval, when said calculated additional regeneration time interval or second additional regeneration time interval, is higher than said maximum heat regeneration time interval or
- wherein the controller unit comprises means of maintaining said adsorption vessel in a second regeneration cycle if said calculated additional regeneration time interval, or second additional regeneration time interval, is comprised within the interval delimited by the minimum regeneration time interval and the maximum regeneration time interval and/or stopping said first regenerating cycle after the maximum regeneration time interval, when said calculated additional regeneration time interval, or second additional regeneration time interval, is higher than the maximum regeneration time interval.

* * * * *